United States Patent
Kirk et al.

(10) Patent No.: US 11,049,273 B2
(45) Date of Patent: Jun. 29, 2021

(54) SYSTEMS AND METHODS FOR GENERATING A VISIBILITY COUNTS PER PIXEL OF A TEXTURE ATLAS ASSOCIATED WITH A VIEWER TELEMETRY DATA

(71) Applicant: Onmivor, Inc., Seattle, WA (US)

(72) Inventors: Adam G. Kirk, Mercer Island, WA (US); Oliver A. Whyte, Seattle, WA (US); Amit Mital, Bellevue, WA (US)

(73) Assignee: Omnivor, Inc., Seattle, WA (US)

( * ) Notice: Subject to any disclaimer, the term of this patent is extended or adjusted under 35 U.S.C. 154(b) by 0 days.

(21) Appl. No.: 16/872,259

(22) Filed: May 11, 2020

(65) Prior Publication Data

US 2020/0279385 A1 Sep. 3, 2020

Related U.S. Application Data

(63) Continuation-in-part of application No. 16/440,369, filed on Jun. 13, 2019, now Pat. No. 10,692,247, which is a continuation-in-part of application No. 16/262,860, filed on Jan. 30, 2019, now Pat. No. 10,360,727, and a continuation-in-part of application No. PCT/US2018/044826, filed on Aug. 1, 2018, said application No. 16/262,860 is a continuation-in-part (Continued)

(51) Int. Cl.
*G06T 7/529* (2017.01)
*G06T 15/04* (2011.01)
*G06T 15/40* (2011.01)

(52) U.S. Cl.
CPC .............. *G06T 7/529* (2017.01); *G06T 15/04* (2013.01); *G06T 15/405* (2013.01); *G06T 2207/10016* (2013.01); *G06T 2207/10024* (2013.01); *G06T 2219/2016* (2013.01)

(58) Field of Classification Search
CPC ....... G06T 7/529; G06T 15/04; G06T 15/405; G06T 2207/10016; G06T 2219/2016; G06T 2207/10024
See application file for complete search history.

(56) References Cited

U.S. PATENT DOCUMENTS

| 6,859,554 B2 * | 2/2005 | Porikli .................. G06K 9/342 375/E7.081 |
| 2008/0112684 A1 * | 5/2008 | Matsushita ............ G11B 27/28 386/278 |

(Continued)

*Primary Examiner* — Said Broome
(74) *Attorney, Agent, or Firm* — Law Office of Mark A. Thomas

(57) ABSTRACT

A processor-implemented method of generating a three-dimensional (3D) volumetric video with an overlay representing visibility counts per pixel of a texture atlas, associated with a viewer telemetry data is provided. The method includes (i) capturing the viewer telemetry data, (ii) determining a visibility of each pixel in the texture atlas associated with a 3D content based on the viewer telemetry data, (iii) generating at least one visibility counts per pixel of the texture atlas based on the visibility of each pixel in the texture atlas, and (iv) generating one of: the 3D volumetric video with the overlay of at least one heat map associated with the viewer telemetry data, using the at least one visibility counts per pixel and a curated selection of the 3D volumetric content based on the viewer telemetry data, using the visibility counts per pixel.

20 Claims, 28 Drawing Sheets

Related U.S. Application Data of application No. 16/049,764, filed on Jul. 30, 2018, now Pat. No. 10,229,537.

(56) References Cited

U.S. PATENT DOCUMENTS

2015/0294492 A1* 10/2015 Koch ................... H04N 13/243
　　　　　　　　　　　　　　　　　　　345/426
2018/0046167 A1* 2/2018 Iverson .............. G06K 9/00201

* cited by examiner

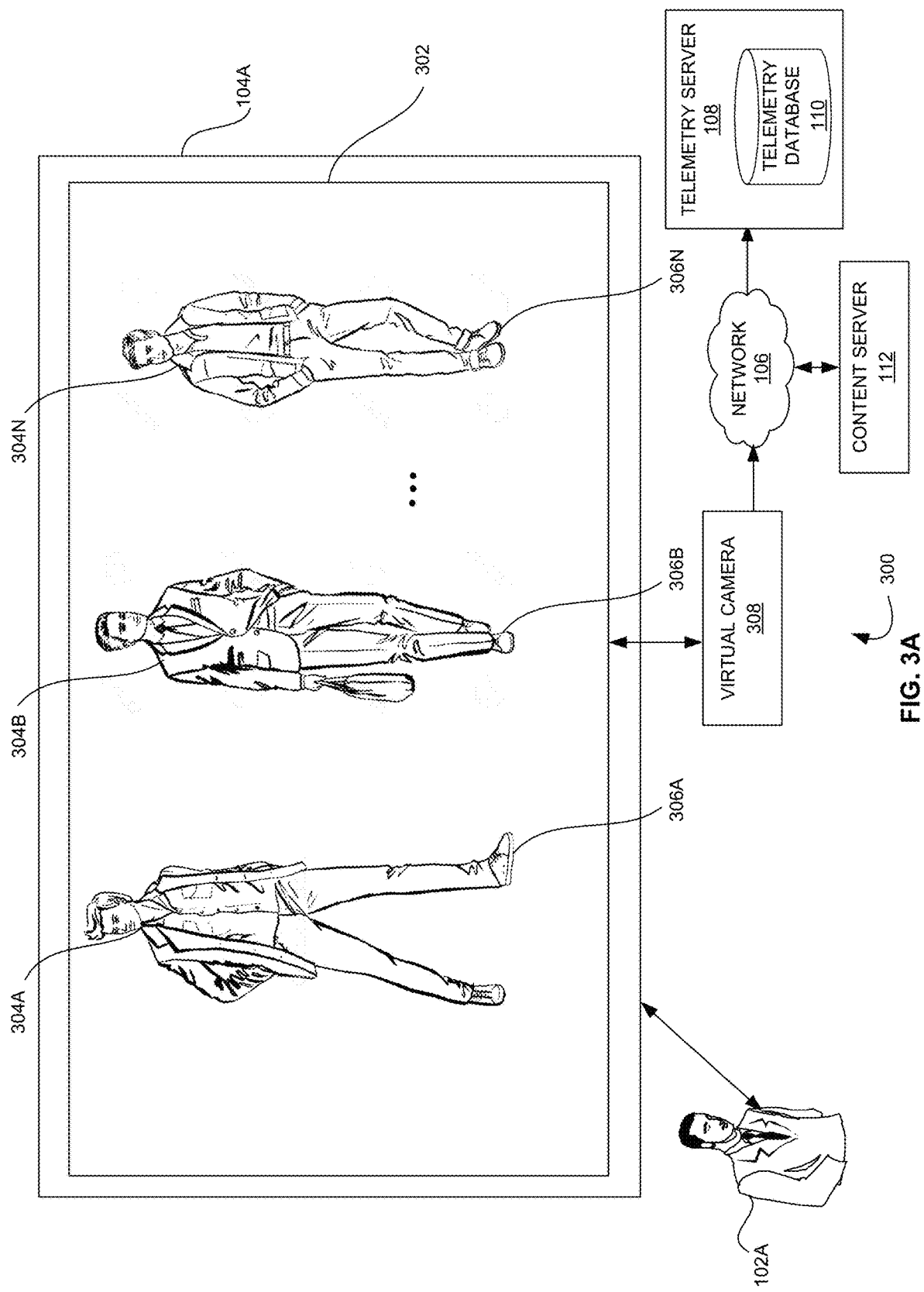

SYSTEMS AND METHODS FOR GENERATING A VISIBILITY COUNTS PER PIXEL OF A TEXTURE ATLAS ASSOCIATED WITH A VIEWER TELEMETRY DATA

CROSS-REFERENCE TO RELATED APPLICATIONS

This patent application claims priority to U.S. non-provisional patent application Ser. No. 16/440,369 filed on Jun. 13, 2019, U.S. non-provisional patent application Ser. No. 16/262,860 filed on Jan. 30, 2019, PCT patent application no. PCT/US18/44826, filed on Aug. 1, 2018, U.S. non-provisional patent application Ser. No. 16/049,764 filed on Jul. 30, 2018, and U.S. provisional patent application No. 62/540,111 filed on Aug. 2, 2017, the complete disclosures of which, in their entireties, are hereby incorporated by reference.

BACKGROUND

Technical Field

Embodiments of this disclosure generally relate to volumetric video analytics, and more particularly, to methods and systems for displaying counts per pixel of a texture atlas, associated with a viewer telemetry data, for at least one of generating a three-dimensional (3D) video with an overlay associated with the viewer telemetry data and generating and displaying a curated selection of content based on the viewer telemetry data.

Description of the Related Art

Volumetric video is a technique that captures a three-dimensional space, such as a location or performance. This type of volumography acquires data that can be viewed on flat screens as well as using 3D displays and virtual reality (VR) goggles. Consumer-facing formats are numerous and the required motion capture techniques lean on computer graphics, photogrammetry, and other computation-based methods. The viewer generally experiences the result in a real-time engine and has direct input in exploring the generated volume.

The volumetric video, captures a representation of surfaces in three-dimensional (3D) space, and combines the visual quality of photography with the immersion and interactivity of 3D content. The volumetric video may be captured using multiple cameras to capture surfaces inside a defined volume by filming from multiple viewpoints and interpolating over space and time. Alternatively, the volumetric video may be created from a synthetic 3D model. One of the features of volumetric video is the ability to view a scene from multiple angles and perspectives.

Video analytics are used to measure, analyse and report a number of videos viewed or watched online by a user. Video analytics enables online video publishers, advertisers, media companies and agencies to understand overall consumption patterns of a video that is shared by a corresponding party. The video analytics captures and examines data describing viewer perspective associated with watching a video.

Historically, data analytics techniques were used to measure a business's marketing and/or advertising results and find out where they stand amidst fierce competition. For traditional video, the video analytics are typically limited to number and duration of views as well as segments viewed, e.g., first quartile, second quartile, etc. Another drawback with existing video analytics is their compatibility only extends to traditional video and not to volumetric video.

Accordingly, there remains a need for a more efficient method for mitigating and/or overcoming drawbacks associated with current methods.

SUMMARY

In view of the foregoing, embodiments herein provide a processor-implemented method of generating a three-dimensional (3D) volumetric video with an overlay representing visibility counts per pixel of a texture atlas, associated with a viewer telemetry data. The method includes (i) capturing the viewer telemetry data, (ii) determining a visibility of each pixel in the texture atlas associated with the 3D content based on the viewer telemetry data, (iii) generating at least one visibility counts per pixel of the texture atlas based on the visibility of each pixel in the texture atlas and (iv) generating the 3D volumetric video with the overlay of at least one heat map associated with the viewer telemetry data, using the at least one visibility counts per pixel. The viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content. The at least one visibility counts per pixel of the texture atlas includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations.

In some embodiments, generating the 3D volumetric video with the overlay of the at least one heat map includes (i) generating the at least one heat map with a RGB color per pixel based on the at least one visibility counts per pixel of the texture atlas; and (ii) replacing at least one original texture map of the 3D content with the at least one heat map associated with the viewer telemetry data for each source geometry of the 3D volumetric video to generate the 3D volumetric video with the overlay of the at least one heat map.

In some embodiments, generating the at least one heat map including (i) generating at least one visibility histogram based on the visibility counts per pixel and (ii) converting the at least one visibility histogram into the at least one heat map.

In some embodiments, determining the visibility includes (i) generating at least one of: an index map comprising an image same size as the texture atlas that assigns a unique color to each valid pixel associated with each frame of the 3D content and a visibility texture atlas, (ii) rendering an image associated with the 3D content with the index map comprising the unique color to each valid pixel based on the viewer telemetry data and at least one index texture map to obtain an index rendered image and (iii) determining the visibility of each valid pixel by mapping unique colors in the rendered image for a frame to a location of visible pixels in the visibility texture atlas. In some embodiments, the visibility texture atlas is a texture atlas that provides visibility information of at least a subset of pixels in the texture atlas. In some embodiments, there is a one to one mapping between unique colors per frame in the index map and the location of the visible pixels in the visibility texture atlas.

In some embodiments, determining the visibility includes (i) rendering a 3D model into a depth buffer, (ii) generating the visibility texture atlas by initializing an image of a same size as the texture atlas, (iii) representing a visibility of pixels in the visibility texture atlas in a boolean lookup table having a size that is the same as the size of the visibility texture atlas, (iv) rendering the 3D model with a fragment shader by (a) querying the depth buffer by the fragment shader to determine if a fragment is visible and (b) performing one of: assigning a visible token value to at least one texture coordinate in the visibility texture atlas, if the fragment is visible; or retaining a not visible token value in the visibility texture atlas if the fragment is not visible, and (iv) determining the visibility of each pixel of the visibility texture atlas based on the 3D model. In some embodiments, the boolean lookup table includes the not visible token value corresponding to each pixel in the visibility texture atlas.

In some embodiments, determining the visibility includes (i) placing a 3D geometry into a spatial data structure that supports at least one ray casting query, (ii) generating (a) a 3D point for each pixel in the visibility texture atlas, or (b) the 3D point and a corresponding bounding box using a depth atlas for each valid pixel in the visibility texture atlas and (iii) determining the visibility of the 3D point by ray-casting to a virtual camera associated with the at least one viewer and finding intersections indicating the 3D point is not visible.

In some embodiments, the method includes (i) mapping at least one value in the image back to at least one pixel in the at least one texture map and (ii) generating the at least one visibility histogram of the visibility texture atlas based on the mapping.

In one aspect, a processor-implemented method of generating a curated selection of three-dimensional (3D) volumetric content based on a viewer telemetry data is provided. The method includes (i) capturing the viewer telemetry data, (ii) determining a visibility of each pixel in the texture atlas associated with the 3D content based on the viewer telemetry data, (iii) generating at least one visibility counts per pixel of the texture atlas based on the visibility of each pixel in the texture atlas and (iv) generating the curated selection of the 3D volumetric content based on the viewer telemetry data, using the visibility counts per pixel. The viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content. The at least one visibility counts per pixel includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations.

In some embodiments, generating the curated selection of the 3D volumetric content includes (i) computing a distance function by employing a standard algorithm on a feature vector comprising at least one of three degrees of freedom of position, three degrees of freedom of orientation and a field of view and using the visibility counts per pixel, (ii) clustering a plurality of views of the 3D volumetric content to obtain a set of clustered views that are different from one another between one or more canonical views, and that are similar to an original telemetry and (iii) generating the curated selection of the 3D volumetric content based on the set of clustered views. In some embodiments, the distance function is given by:

$$d\_ij = \text{alpha}*(l2\_\text{norm}(p\_i - p\_j)) + \text{beta}*(\text{dot\_product}(q\_i, q\_j)) + \text{gamma}*(f\_i - f\_j)$$

In some embodiments, alpha, beta, gamma are relative weighting parameters. In some embodiments, i and j refer to unique views, p_i is position i and p_j is position j. In some embodiments, p represents three degrees of freedom in position, q represents three degrees of orientation in an axis-angle encoding, f is the field of view. In some embodiments, p and q are 3 dimensional, l2_norm or dot_product are functions that take N dimensional vectors and return scalars. In some embodiments, clustering is performed based on the distance function using the standard clustering algorithm.

In some embodiments, generating the curated selection of the 3D volumetric content includes (i) generating an initial set of clusters of views for refining using at least one visibility histogram, (ii) defining a score for at least one view from among the initial set of clusters of views, (iii) sampling scores for nearby views of the 3D volumetric content based on the at least one visibility histogram to define a gradient and (iv) computing n steps of a gradient descent to generate the curated selection of the 3D volumetric content based on the scores. In some embodiments, the score is the sum of the visibility counts per pixel for each pixel of the texture atlas visible from the at least one view, divided by a number of pixels of the texture atlas visible in the at least one view. In some embodiments, n is a whole number.

In some embodiments, determining the visibility includes (i) generating at least one of: an index map comprising an image same size as the texture atlas that assigns a unique color to each valid pixel associated with each frame of the 3D content and a visibility texture atlas, (ii) rendering an image associated with the 3D content with the index map comprising the unique color to each valid pixel based on the viewer telemetry data and at least one index texture map to obtain an index rendered image and (iii) determining the visibility of each valid pixel by mapping unique colors in the rendered image for a frame to a location of visible pixels in the visibility texture atlas. In some embodiments, the visibility texture atlas is a texture atlas that provides visibility information of at least a subset of pixels in the texture atlas. In some embodiments, there is a one to one mapping between unique colors per frame in the index map and the location of the visible pixels in the visibility texture atlas.

In some embodiments, determining the visibility includes (i) rendering a 3D model into a depth buffer, (ii) generating the visibility texture atlas by initializing an image of a same size as the texture atlas, (iii) representing a visibility of pixels in the visibility texture atlas in a boolean lookup table having a size that is the same as the size of the visibility texture atlas, (iv) rendering the 3D model with a fragment shader by (a) querying the depth buffer by the fragment shader to determine if a fragment is visible and (b) performing one of: assigning a visible token value to at least one texture coordinate in the visibility texture atlas, if the fragment is visible; or retaining a not visible token value in the visibility texture atlas if the fragment is not visible, and (iv) determining the visibility of each pixel of the visibility texture atlas based on the 3D model. In some embodiments, the boolean lookup table includes the not visible token value corresponding to each pixel in the visibility texture atlas.

In some embodiments, determining the visibility includes (i) placing a 3D geometry into a spatial data structure that supports at least one ray casting query, (ii) generating (a) a 3D point for each pixel in the visibility texture atlas, or (b) the 3D point and a corresponding bounding box using a depth atlas for each valid pixel in the visibility texture atlas and (iii) determining the visibility of the 3D point by ray-casting to a virtual camera associated with the at least one viewer and finding intersections indicating the 3D point is not visible.

In another aspect, a system for generating a three-dimensional (3D) volumetric video with an overlay representing visibility counts per pixel of a texture atlas, associated with a viewer telemetry is provided. The system includes a processor and a non-transitory computer readable storage medium storing one or more sequences of instructions, which when executed by the processor, performs a method including: (i) capturing the viewer telemetry data, (ii) determining a visibility of each pixel in the texture atlas associated with the 3D content based on the viewer telemetry data, (iii) generating at least one visibility counts per pixel of the texture atlas based on the visibility of each pixel in the texture atlas and (iv) generating the 3D volumetric video with the overlay of at least one heat map associated with the viewer telemetry data, using the at least one visibility counts per pixel. The viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content. The at least one visibility counts per pixel of the texture atlas includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations.

In some embodiments, generating the 3D volumetric video with the overlay of the at least one heat map includes (i) generating the at least one heat map with a RGB color per pixel based on the at least one visibility counts per pixel of the texture atlas; and (ii) replacing at least one original texture map of the 3D content with the at least one heat map associated with the viewer telemetry data for each source geometry of the 3D volumetric video to generate the 3D volumetric video with the overlay of the at least one heat map.

In some embodiments, generating the at least one heat map including (i) generating at least one visibility histogram based on the visibility counts per pixel and (ii) converting the at least one visibility histogram into the at least one heat map.

In some embodiments, determining the visibility includes (i) generating at least one of: an index map comprising an image same size as the texture atlas that assigns a unique color to each valid pixel associated with each frame of the 3D content and a visibility texture atlas, (ii) rendering an image associated with the 3D content with the index map comprising the unique color to each valid pixel based on the viewer telemetry data and at least one index texture map to obtain an index rendered image and (iii) determining the visibility of each valid pixel by mapping unique colors in the rendered image for a frame to a location of visible pixels in the visibility texture atlas. In some embodiments, the visibility texture atlas is a texture atlas that provides visibility information of at least a subset of pixels in the texture atlas. In some embodiments, there is a one to one mapping between unique colors per frame in the index map and the location of the visible pixels in the visibility texture atlas.

In yet another aspect, a system for generating a curated selection of three-dimensional (3D) volumetric content based on a viewer telemetry data is provided. The system including a processor and a non-transitory computer readable storage medium storing one or more sequences of instructions, which when executed by the processor, performs a method including (i) capturing the viewer telemetry data, (ii) determining a visibility of each pixel in the texture atlas associated with the 3D content based on the viewer telemetry data, (iii) generating at least one visibility counts per pixel of the texture atlas based on the visibility of each pixel in the texture atlas and (iv) generating the curated selection of the 3D volumetric content based on the viewer telemetry data, using the visibility counts per pixel. The viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content. The at least one visibility counts per pixel includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations.

In some embodiments, generating the curated selection of the 3D volumetric content includes (i) computing a distance function by employing a standard algorithm on a feature vector comprising at least one of three degrees of freedom of position, three degrees of freedom of orientation and a field of view and using the visibility counts per pixel, (ii) clustering a plurality of views of the 3D volumetric content to obtain a set of clustered views that are different from one another between one or more canonical views, and that are similar to an original telemetry and (iii) generating the curated selection of the 3D volumetric content based on the set of clustered views. In some embodiments, the distance function is given by:

$$d\_ij = \text{alpha} * (l2\_\text{norm}(p\_i - p\_j)) + \text{beta} * (\text{dot\_product}(q\_i, q\_j)) + \text{gamma} * (f\_i - f\_j)$$

In some embodiments, alpha, beta, gamma are relative weighting parameters. In some embodiments, i and j refer to unique views, p_i is position i and p_j is position j. In some embodiments, p represents three degrees of freedom in position, q represents three degrees of orientation in an axis-angle encoding, f is the field of view. In some embodiments, p and q are 3 dimensional, l2_norm or dot_product are functions that take N dimensional vectors and return scalars. In some embodiments, clustering is performed based on the distance function using the standard clustering algorithm.

In some embodiments, generating the curated selection of the 3D volumetric content includes (i) generating an initial set of clusters of views for refining using at least one visibility histogram, (ii) defining a score for at least one view from among the initial set of clusters of views, (iii) sampling scores for nearby views of the 3D volumetric content based on the at least one visibility histogram to define a gradient and (iv) computing n steps of a gradient descent to generate the curated selection of the 3D volumetric content based on the scores. In some embodiments, the score is the sum of the visibility counts per pixel for each pixel of the texture atlas visible from the at least one view, divided by a number of pixels of the texture atlas visible in the at least one view. In some embodiments, n is a whole number.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A-3C exemplarily illustrate an example process of capturing the viewer telemetry data based on a user interaction and displaying the 3D content by the volumetric video analytics server of FIG. 1, according to some embodiments herein;

DETAILED DESCRIPTION OF PREFERRED EMBODIMENTS

Figure 1:
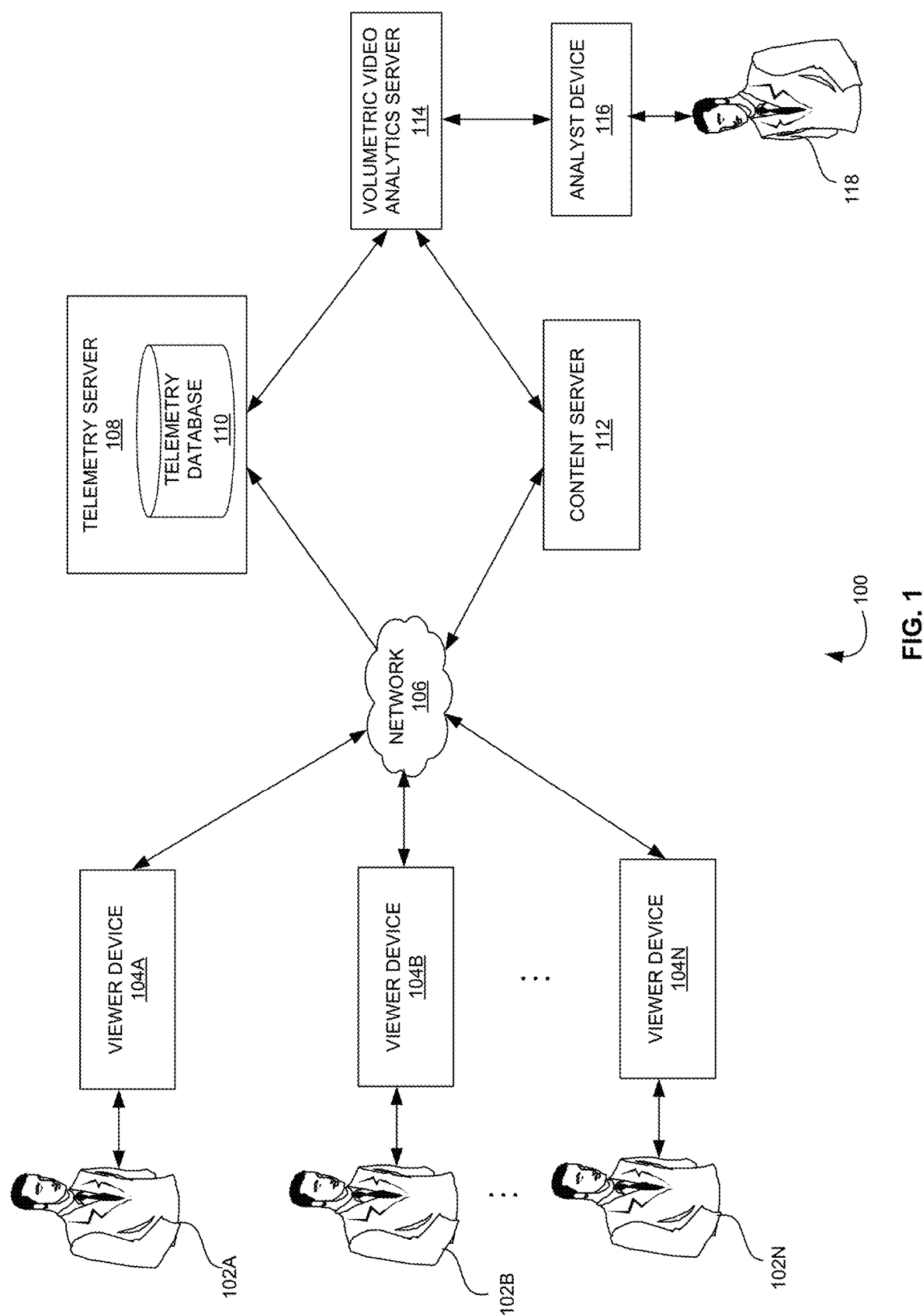
FIG. 1 is a block diagram that illustrates generating a visibility counts per pixel of a texture atlas, for at least one of generating a three-dimensional (3D) volumetric video with an overlay associated with the viewer telemetry data and generating a curated selection of a 3D volumetric content based on the viewer telemetry data, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 13, preferred embodiments are shown, where similar reference characters denote corresponding features consistently throughout the figures.

FIG. 1 is a block diagram 100 that illustrates generating a visibility counts per pixel of a texture atlas, for at least one of generating a three-dimensional (3D) volumetric video with an overlay associated with the viewer telemetry data and generating a curated selection of a 3D volumetric content based on the viewer telemetry data, according to some embodiments herein. The block diagram 100 includes one or more viewer devices 104A-N associated with one or more viewers 102A-N, a network 106, a telemetry server 108 that includes a telemetry database 110, a content server 112, a volumetric video analytics server 114 and an analyst device 116 associated with an analyst 118.

The content server 112 delivers 3D content to the one or more viewer devices 104A-N associated with the one or more viewers 102A-N through the network 106. In some embodiments, the 3D content is a 3D asset or a 3D video. In some embodiments, the 3D content is a volumetric video. In some embodiments, the content server 112 tags the 3D content with demographic data. In some embodiments, the demographic data includes age, gender and locations of the one or more viewers 102A-N.

In some embodiments, the content server 112 is implemented as a Content Delivery Network (CDN), e.g., an Amazon CloudFront, Cloudflare, Azure or an Edgecast Content Delivery Network. In some embodiments, the content server 112 is associated with an online video publisher, e.g., YouTube by Google, Inc., Amazon Prime Video by Amazon, Inc., Apple TV by Apple, Inc., Hulu and Disney Plus by The Walt Disney Company, Netflix by Netflix, Inc., CBS All Access by ViacomCBS, Yahoo Finance by Verizon Media, etc., and/or an advertiser, e.g., Alphabet, Inc, Amazon Inc, Facebook, Instagram, etc. In some embodiments, the content server 112 is associated with a media company, e.g., Warner Media, News Corp, The Walt Disney Company, etc.

A list of devices that are capable of functioning as the content server 112, without limitation, may include a server, a server network, a mobile phone, a Personal Digital Assistant (PDA), a tablet, a desktop computer, or a laptop. In some embodiments, the network 106 is a wired network. In some embodiments, the network 106 is a wireless network. In some embodiments, the network 106 is a combination of the wired network and the wireless network. In some embodiments, the network 106 is the Internet.

In some embodiments, the one or more viewers 102A-N may access the 3D content received from the content server 112 through the network 106, at the one or more viewer devices 104A-N. In some embodiments, the one or more viewer devices 104A-N, without limitation, are selected from a mobile phone, a Personal Digital Assistant (PDA), a tablet, a desktop computer, a laptop computer, a head mounted display, and the like.

In some embodiments, the one or more viewers 102A-N may manipulate the 3D content by for example, clicking on 3D models of objects, e.g., shoes, watches, bags, etc. in an e-commerce website such as Amazon.com to zoom in and obtain details, e.g., price, size, etc. In some embodiments, interactions of the one or more viewers 102A-N with the 3D content are captured in real-time and transmitted to the telemetry server 108.

The one or more viewers 102A-N may manipulate the 3D content by for example, moving a virtual camera, or by clicking on the 3D models to zoom in and obtain the details or zoom out to get a larger perspective. In some embodiments, the interaction of the one or more viewers 102A-N with the 3D content may include playing, pausing, scrubbing, filtering of the 3D content and the like. While the one or more viewers 102A-N interact with the 3D content, the viewer telemetry data is simultaneously recorded on the telemetry server 108.

In some embodiments, if the one or more viewers 102A-N logs into the e-commerce website, e.g., Amazon.com, the e-commerce website, e.g., Amazon.com may share specific demographic data or User identifications (IDs) of the one or more viewers 102A-N with the volumetric video analytics server 114.

The telemetry server 108 captures the viewer telemetry data of the one or more viewers 102A-N of the 3D content from the one or more viewer devices 104A-N. In some embodiments, the telemetry server 108 stores the viewer telemetry data at the telemetry database 110. In some embodiments, the viewer telemetry data corresponds to at least one of the visibility counts per pixel, data describing at least one of intrinsic camera parameters and extrinsic camera parameters and an associated time during the 3D content, and data describing and recording a viewer interaction with the 3D content and an associated time during the 3D content. The intrinsic camera parameters may include a focal length, an image sensor format, and a principal point. In some embodiments, the focal length may be represented in terms of pixels. The extrinsic camera parameters denote coordinate system transformations from 3D world coordinates to 3D camera coordinates and also defines a position of camera's center and the camera's orientation in world coordinates.

The volumetric video analytics server 114 captures the 3D content from the content server 112 and corresponding viewer telemetry data of the 3D content stored in the telemetry database 110 of the telemetry server 108. In some embodiments, the volumetric video analytics server 114 and the telemetry server 108 may be implemented within a single system, as a combination of one or more servers.

The volumetric video analytics server 114 determines a visibility of each pixel in the texture atlas associated with the 3D content based on the viewer telemetry data. In some embodiments, the "texture atlas" refers to an image including multiple smaller images, usually packed together to reduce overall dimensions. An atlas that includes uniformly-sized images or images of varying dimensions and a sub-image is drawn using custom texture coordinates to pick it out of the atlas. A scene associated with the 3D content may be rendered into one or more texture atlases. Each texture atlas can be of for example, 1920×1280 pixels, or 1024×768 pixels in size. As used herein the term "visibility texture atlas" refers to the texture atlas providing visibility information of associated pixels.

In some embodiments, the volumetric video analytics server 114 determines the visibility by: (i) generating an index map that assigns a unique color to each valid pixel associated with each frame of the 3D content in the visibility texture atlas, (ii) rendering an image, e.g., the image of a product, such as a shoe, a bag, etc., associated with the 3D content, with the index map including the unique color to each valid pixel based on the viewer telemetry data and an index texture map to obtain an index rendered image and (iii) determining the visibility of each valid pixel by mapping unique colors in the rendered image for a frame to a location of visible pixels in the visibility texture atlas. In some embodiments, there is a one to one mapping between the unique colors per frame in the index map and the location of the visible pixels in the visibility texture atlas. In some embodiments, each valid pixel is assigned a color value that is specific to that valid pixel for a given frame. In some embodiments, each valid pixel is assigned a color value that is unique to that valid pixel for the given frame. In some embodiments, the unique color value for a pixel is determined by the location of that pixel in the index map. In some embodiments, the volumetric video analytics server 114 stores a determined visibility of each pixel in the texture atlas associated with the 3D content in a database. In some embodiments, the volumetric video analytics server 114 stores the determined visibility of each pixel in the texture atlas as a Boolean lookup table. In some embodiments, the Boolean lookup table has the same size as the texture atlas.

In some embodiments, the volumetric video analytics server 114 turns off lighting during rendering the image for preventing attenuation of resulting colors of the rendered image. In some embodiments, the volumetric video analytics server 114 renders the image using a nearest neighbor texture interpolation.

In some embodiments, the volumetric video analytics server 114 determines the visibility by (i) rendering a 3D model into a depth buffer and saving the depth buffer, (ii)

generating the visibility texture atlas by initializing an image of a same size as a texture atlas to zero, (iii) rendering the 3D model with a fragment shader, (iv) representing a visibility of pixels in the visibility texture atlas in a boolean lookup table having a size that is the same as the size of the visibility texture atlas and (v) determining the visibility of each pixel of the visibility texture atlas based on the 3D model. In some embodiments, the boolean lookup table includes a not visible token value corresponding to each pixel in the visibility texture atlas. In some embodiments, the volumetric video analytics server 114 renders the 3D model with the fragment shader by (i) querying the depth buffer by the fragment shader to determine if a fragment is visible. In some embodiments, the volumetric video analytics server 114 assigns a visible token value to a texture coordinate in the visibility texture atlas, if the fragment is visible. In some embodiments, the volumetric video analytics server 114 retains the not visible token value in the visibility texture atlas if the fragment is not visible. In some embodiments, the fragment shader is a shader stage that may process the fragment generated by rasterization into a set of colors and a single depth value.

In some embodiments, the volumetric video analytics server 114 determines the visibility by (i) placing a 3D geometry into a spatial data structure that supports a ray casting query, (ii) generating a 3D point for each pixel in the visibility texture atlas or the 3D point and a corresponding bounding box using a depth atlas for each valid pixel in the visibility texture atlas and (iii) determining visibility of the 3D point by ray-casting to or from the one or more virtual cameras associated with the one or more viewers 102A-N. If the ray-casting detects an intersection between the virtual camera and the 3D point, the 3D point is not visible. In some embodiments, the volumetric video analytics server 114 determines the visibility of the 3D point for each pixel in the visibility texture atlas by ray-casting to the one or more virtual cameras associated with the one or more viewers 102A-N.

In some embodiments, the 3D geometry refers to mathematics of shapes in three-dimensional space and consists of three coordinates. In some embodiments, the three coordinates are x-coordinate, y-coordinate and z-coordinate. In some embodiments, the Ray casting is a computer graphics algorithm used to efficiently compute intersection points along a ray defined as having an origin point and a ray direction. In some embodiments, the spatial data structures are structures that store spatial data, that is, data that has geometric coordinates.

The volumetric video analytics server 114 generates a visibility count per pixel of the texture atlas based on the visibility of each pixel in the texture atlas. The visibility count per pixel of the texture atlas includes at least one of: the visibility counts per pixel of views per pixel, a visibility counts per pixel of a virtual camera position, a visibility counts per pixel of the viewer interaction with the 3D content, and a visibility counts per pixel of a virtual camera orientation. In some embodiments, the volumetric video server 114 maps a value in the image back to a pixel in the texture map.

In some embodiments, the volumetric video analytics server 114 generates a visibility histogram of the visibility texture atlas based on the mapping. In some embodiments, the visibility histogram is a histogram of the visibility texture atlas. In some embodiments, the histogram refers to the histogram of pixel intensity values. In some embodiments, the mapping is a mapping of a value in the image back to the pixel in the texture map. In some embodiments, the histogram is a graph that depicts a number of pixels in an image at each different intensity value that is identified in the image. For example, an 8-bit grayscale image, there are 256 different possible intensities, and the histogram may graphically display 256 numbers showing a distribution of pixels amongst those grayscale values.

In some embodiments, the volumetric video analytics server 114 generates the 3D volumetric video with the overlay of a heat map associated with the viewer telemetry data using the visibility counts per pixel. The heat map represents different levels of display frequency associated with each of the pixels in the 3D volumetric video to make it more straight forward to determine which perspectives are the most popular. In some embodiments, the volumetric video analytics server 114 generates the heat map with a Red Green and Blue (RGB) color per pixel based on the visibility counts per pixel of the texture atlas. In some embodiments, the volumetric video analytics server 114 replaces an original texture map of the 3D content with the heat map associated with the viewer telemetry data for each source geometry of the 3D volumetric video to generate the 3D volumetric video with the overlay of the heat map. In some embodiments, the texture map is an image applied (mapped) to a surface of a shape or polygon. This may be a bitmap image or a procedural texture.

The volumetric video analytics server 114 automatically generates the curated selection of the 3D volumetric content based on the viewer telemetry data, as described below, using the visibility counts per pixel. In some embodiments, the volumetric video analytics server 114 receives a request for the curated selection of the 3D volumetric content from the analyst 118 via the analyst device 116 associated with the analyst 118. In some embodiments, the volumetric video analytics server 114 automatically selects views for the one or more viewers 102A-N based on analytics, or the analyst 118 may change various visualization modes by selecting or changing one or more viewing parameters, using a drop-down menu. In some embodiments, the analyst device 116, without limitation, is selected from a mobile phone, a Personal Digital Assistant (PDA), a tablet, a desktop computer, or a laptop.

In some embodiments, the volumetric video analytics server 114 generates the curated selection of the 3D volumetric content by (i) computing a distance function by employing a standard algorithm on a feature vector including at least one of three degrees of freedom of position, three degrees of freedom of orientation and a field of view and using the visibility counts per pixel, (ii) clustering one or more views of the 3D volumetric content, based on the distance function and using a standard clustering algorithm, to obtain a set of canonical views, e.g., a front view, a right-side view, a left-side view, and the like, that are different from one another but similar to an original telemetry, and (iii) generating the curated selection of the 3D volumetric content based on the set of clustered views.

In some embodiments, the distance function is given by $$d\_ij = \text{alpha} * (l2\_\text{norm}(p\_i - p\_j)) + \text{beta} * (\text{dot\_product}(q\_i, q\_j)) + \text{gamma} * (f\_i - f\_j).$$

In some embodiments, alpha, beta, gamma are relative weighting parameters which are equal or greater than zero. In some embodiments, i and j refer to unique views, pi is position i and p_j is position j. In some embodiments, the p represents three degrees of freedom of position, the q represents three degrees of orientation in axis-angle format, f is the field of view. In some embodiments, p and q are 3 dimensional, l2_norm or dot_product are functions that take N dimensional vectors and return scalars.

In some embodiments, the volumetric video analytics server 114 clusters the one or more views based on the distance function using the standard clustering algorithm. In some embodiments, the standard clustering algorithm, without limitation, is selected from K-Means Clustering, Mean-Shift Clustering, Density-Based Spatial Clustering of Applications with Noise (DBSCAN), Expectation-Maximization (EM) Clustering using Gaussian Mixture Models (GMM), or Agglomerative Hierarchical Clustering.

In some embodiments, the volumetric video analytics server 114 generates the curated selection of the 3D volumetric content by (i) generating an initial set of clusters of views for refining using a visibility histogram, (ii) defining a score for a view from among the initial set of clusters of views, (iii) sampling scores for nearby views of the 3D volumetric content based on the visibility histogram to define a gradient and (iv) computing n steps of a gradient descent to generate the curated selection of the 3D volumetric content based on the scores. In some embodiments, the score is the sum of the visibility counts per pixel for each pixel of the texture atlas visible from the view, divided by a number of pixels of the texture atlas visible in the view. In some embodiments, the n represents a whole number. In some embodiments, the scores are ranked such that a comparison of scores identifies the highest score. The highest score corresponds to a most popular view, and is thus used to select the most popular view for the curated selection.

In some embodiments. the curated selection of videos or images are stored in the volumetric video analytics server 114, and communicated to the one or more viewer devices 104A-N based on their demographics. In some other embodiments, the volumetric video analytics server 114 curates and selects 2D videos or images, which are stored in the content server 112. The volumetric video analytics server 114 may communicate the associated demographic data and/or a list of target viewer devices corresponding to the curated selection, and the content server 112 may communicate the curated selection of 2D videos and/or images to the corresponding target viewer devices 104A-N.

Figure 2A:
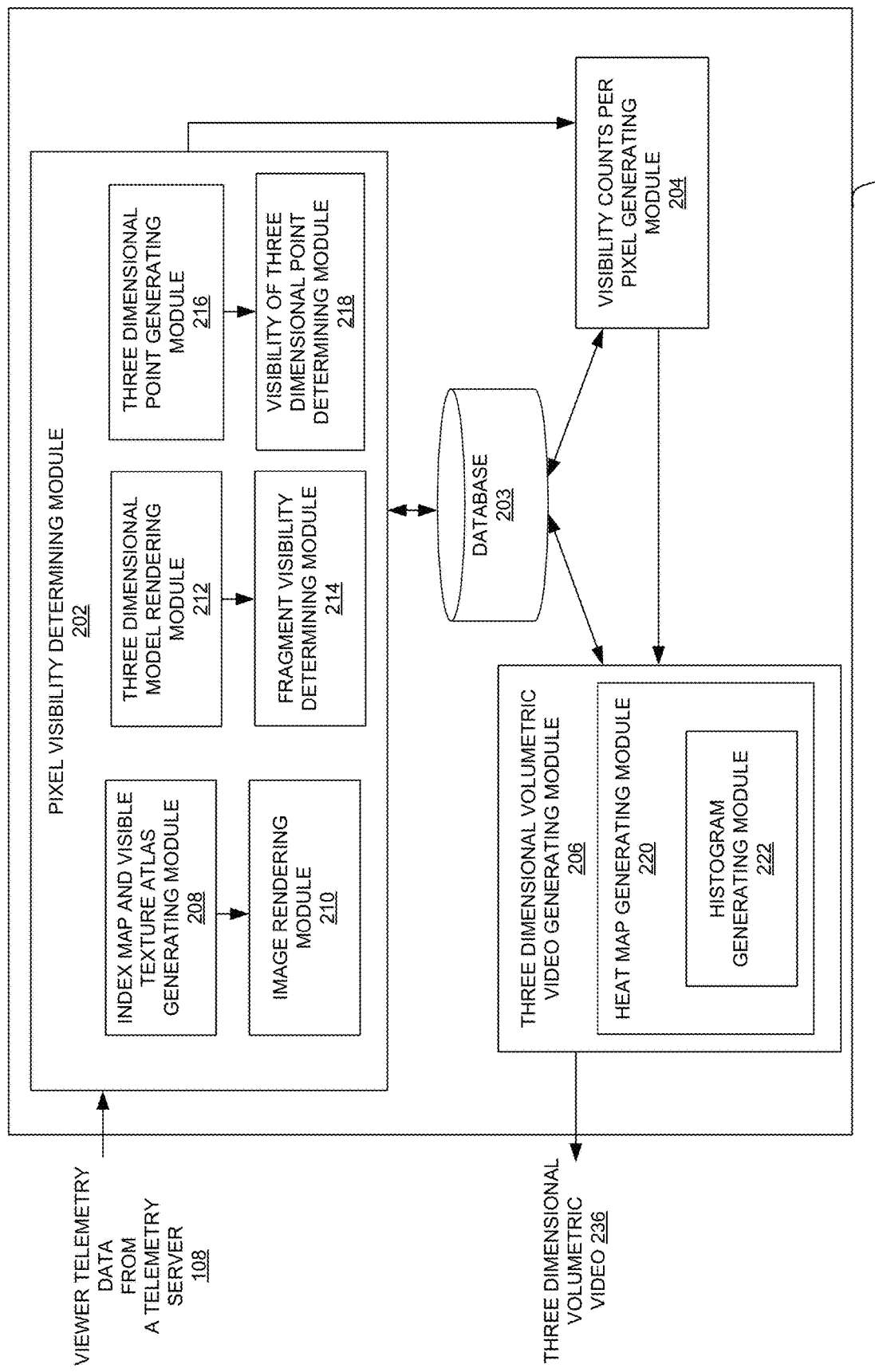
FIG. 2A is a block diagram of the volumetric video analytics server of FIG. 1 for generating the three-dimensional (3D) volumetric video with the overlay associated with the viewer telemetry data, according to some embodiments herein.

FIG. 2A is a block diagram of the volumetric video analytics server 114 of FIG. 1 for generating a three-dimensional (3D) volumetric video 236 with an overlay associated with a viewer telemetry data, according to some embodiments herein. In some embodiments, the volumetric video analytics server 114 includes a pixel visibility determining module 202, a database 203, a display counts per pixel generating module 204 and a three-dimensional (3D) volumetric video generating module 206. The pixel visibility determining module 202 includes an index map and visibility texture atlas generating module 208, an image rendering module 210, a three-dimensional (3D) model rendering module 212, a fragment visibility determining module 214, a three-dimensional point generating module 216 and a visibility of three-dimensional point determining module 218. The three-dimensional (3D) volumetric video generating module 206 includes a heat map generating module 220 that includes a histogram generating module 222.

The pixel visibility determining module 202 captures a 3D content from the content server 112 and the viewer telemetry data of the one or more viewers 102A-N corresponding to the 3D content from the telemetry database 110 of the telemetry server 108. The pixel visibility determining module 202 determines a visibility of each pixel in a texture atlas associated with the 3D content based on the viewer telemetry data. The pixel visibility determining module 202 stores determined visibility of each pixel in the texture atlas associated with the 3D content in the database 203. In some embodiments, the pixel visibility determining module 202 stores the determined visibility of each pixel in the texture atlas as a Boolean lookup table.

The heat map and visibility texture atlas generating module 208 generates at least one of: an index map including an image the same size as the texture atlas that assigns a unique color to each valid pixel associated with each frame of the 3D content and a visibility texture atlas by initializing the image of the same size as the texture atlas to zero. In some embodiments, each valid pixel is assigned a color value that is unique to that valid pixel. The image rendering module 210 renders the image associated with the 3D content with the index map including the unique color to each valid pixel based on the viewer telemetry data and the index texture map to obtain an index rendered image. The pixel visibility determining module 202 determines the visibility of each valid pixel by mapping unique colors in the rendered image for a frame to a location of visible pixels in the visibility texture atlas. In some embodiments, there is a one to one mapping between the unique colors per frame in the index map and the location of the visible pixels in the visibility texture atlas.

The three-dimensional (3D) model rendering module 212 renders a 3D model into a depth buffer. The 3D model rendering module 212 generates the visibility texture atlas by initializing an image of a same size as the texture atlas. The 3D model rendering module 212 represents a visibility of pixels in the visibility texture atlas in a boolean lookup table having a size that is the same as the size of the visibility texture atlas. In some embodiments, the boolean lookup table includes a not visible token value corresponding to each pixel in the visibility texture atlas. The 3D model rendering module 212 renders the 3D model with a fragment shader by querying the depth buffer by the fragment shader to determine if a fragment is visible.

The fragment visibility determining module 214 assigns a visible token value to a texture coordinate in the visibility texture atlas, if the fragment is visible. The fragment visibility determining module 214 retains the not visible token value in the visibility texture atlas if the fragment is not visible. The pixel visibility determining module 202 determines the visibility of each pixel of the visibility texture atlas based on the 3D model.

The 3D point generating module 216 places a 3D geometry into a spatial data structure that supports a ray casting query. The 3D point generating module 216 generates (i) a 3D point for each pixel in the visibility texture atlas or (ii) the 3D point and a corresponding bounding box using a depth atlas for each valid pixel in the visibility texture atlas. The visibility of three-dimensional point determining module 218 determines the visibility of the 3D point by raycasting to or from the pixel to one or more virtual cameras associated with the one or more viewers 102A-N and finding intersections indicating the 3D point is not visible. In some embodiments, the visibility of three-dimensional point determining module 218 determines visibility of the 3D point for each pixel in the visibility texture atlas by raycasting the one or more virtual cameras associated with the one or more viewers 102A-N. In some embodiments, if the ray-casting detects an intersection between the virtual camera and the 3D point, the 3D point is not visible.

The display counts per pixel generating module 204 generates a visibility counts per pixel of the texture atlas based on the visibility of each pixel in the texture atlas. The visibility counts per pixel of the texture atlas includes at least one of: a visibility counts per pixel of views per pixel, a visibility counts per pixel of a virtual camera position, a visibility counts per pixel of a viewer interaction with the 3D content, and a visibility counts per pixel of a virtual camera orientation, similar to that described with regard to FIG. 1.

The 3D volumetric video generating module 206 generates the 3D volumetric video 236 with the overlay of a heat map associated with the viewer telemetry data, using the visibility counts per pixel. In some embodiments, the heat map generating module 220 associated with the three-dimensional (3D) volumetric video generating module 206 generates the heat map with a unique RGB color per pixel based on the visibility counts per pixel of the texture atlas. In some embodiments, the heat map generating module 220 replaces an original texture map of the 3D content with the heat map associated with the viewer telemetry data for each source geometry of the 3D volumetric video 236 to generate the 3D volumetric video 236 with the overlay of the heat map. In some embodiments, the histogram generating module 222 generates a visibility histogram based on the visibility counts per pixel. In some embodiments, the visibility histogram is a histogram of the visibility texture atlas. In some embodiments, the histogram refers to the histogram of pixel intensity values. In some embodiments, the mapping is mapping of a value in the image back to the pixel in the texture map. In some embodiments, the histogram generating module 222 converts the visibility histogram into the heat map.

Figure 2B:
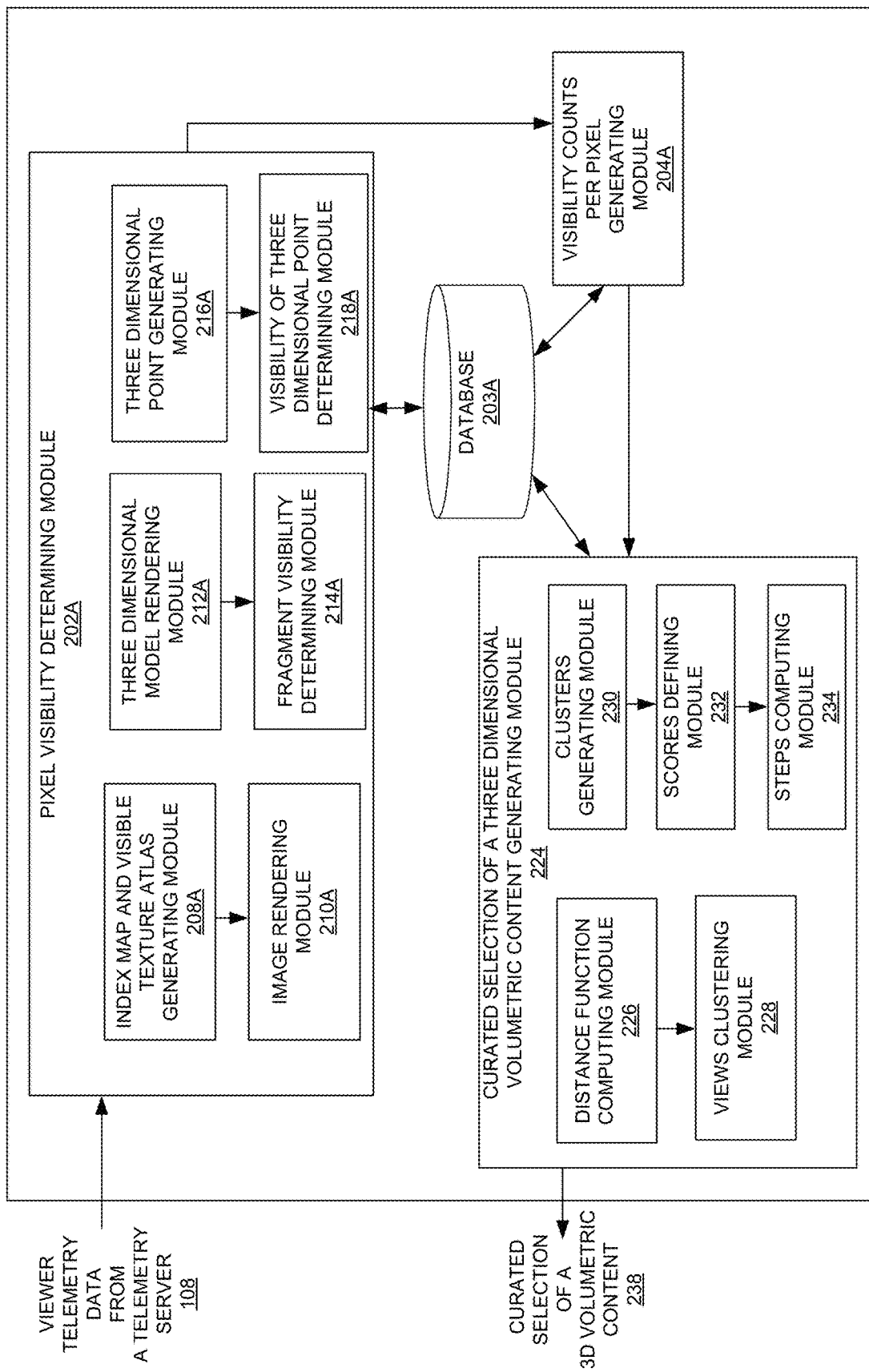
FIG. 2B is a block diagram of the volumetric video analytics server of FIG. 1 for generating the curated selection of the 3D content based on the viewer telemetry data, according to some embodiments herein.

FIG. 2B is a block diagram 201 of the volumetric video analytics server 114 of FIG. 1 for generating a curated selection of a 3D volumetric content 238 based on a viewer telemetry data, according to some embodiments herein. In some embodiments, the volumetric video analytics server 114 includes a pixel visibility determining module 202A, a display counts per pixel generating module 204A and a curated selection of a three-dimensional (3D) volumetric content generating module 224. The pixel visibility determining module 202A includes an index map and visibility texture atlas generating module 208A, an image rendering module 210A, a three-dimensional (3D) model rendering module 212A, a fragment visibility determining module 214A, a three-dimensional point generating module 216A and a visibility of three-dimensional point determining module 218A.

The curated selection of the three-dimensional (3D) volumetric content generating module 224 includes a distance function computing module 226, a views clustering module 228, clusters generating module 230, a scores defining module 232 and a steps computing module 234. The pixel visibility determining module 202A captures the 3D volumetric content 238 from the content server 112 and the viewer telemetry data of the one or more viewers 102A-N corresponding to the 3D volumetric content 238 from the telemetry database 110 of the telemetry server 108. The pixel visibility determining module 202A determines a visibility of each pixel in a texture atlas associated with the 3D volumetric content 238 based on the viewer telemetry data. The pixel visibility determining module 202A stores determined visibility of each pixel in the texture atlas associated with the 3D volumetric content 238 in the database 203A.

The index map and visibility texture atlas generating module 208A generates at least one of: an index map including an image same size as a texture atlas that assigns a unique color to each valid pixel associated with each frame of the 3D volumetric content and the visibility texture atlas by initializing an image of the same size as the texture atlas to zero. In some embodiments each valid pixel is assigned a color value that is unique to that valid pixel. The image rendering module 210A renders the image associated with the 3D volumetric content with the index map including the unique color to each valid pixel based on the viewer telemetry data and the index texture map to obtain an index rendered image. The pixel visibility determining module 202A determines the visibility of each valid pixel by mapping unique colors in the rendered image for a frame to a location of visible pixels in the visibility texture atlas. In some embodiments, there is a one to one mapping between the unique colors per frame in the index map and the location of the visible pixels in the visibility texture atlas.

The three-dimensional (3D) model rendering module 212A renders a 3D model into a depth buffer. The 3D model rendering module 212A generates the visibility texture atlas by initializing an image of a same size as the texture atlas. The 3D model rendering module 212A renders the 3D model with a fragment shader by querying the depth buffer by the fragment shader to determine if a fragment is visible. The 3D model rendering module 212A represents a visibility of pixels in the visibility texture atlas in a boolean lookup table having a size that is the same as the size of the visibility texture atlas. In some embodiments, the boolean lookup table includes a not visible token value corresponding to each pixel in the visibility texture atlas. The fragment visibility determining module 214A assigns a visible token value to a texture coordinate in the visibility texture atlas, if the fragment is visible. The fragment visibility determining module 214A retains the not visible token value in the visibility texture atlas if the fragment is not visible. The pixel visibility determining module 202A determines the visibility of each pixel of the visibility texture atlas based on the 3D model.

The 3D point generating module 216A places a 3D geometry into a spatial data structure that supports a ray casting query. The 3D point generating module 216A generates (i) a 3D point for each pixel in the visibility texture atlas or (ii) the 3D point and a corresponding bounding box using a depth atlas for each valid pixel in the visibility texture atlas. The visibility of three-dimensional point determining module 218A determines the visibility of the 3D point by ray-casting to or from one or more virtual cameras associated with the one or more viewers 102A-N and finding intersections indicating the 3D point is not visible. In some embodiments, the visibility of three-dimensional point determining module 218A determines visibility of the 3D point for each pixel in the visibility texture atlas by ray-casting the one or more virtual cameras associated with the one or more viewers 102A-N. In some embodiments, if the ray-casting detects an intersection between the virtual camera and the 3D point, the 3D point is not visible.

As described above with regard to FIG. 2A, the display counts per pixel generating module 204A generates the visibility counts per pixel of the texture atlas based on the visibility of each pixel in the texture atlas. The visibility counts per pixel of the texture atlas includes at least one of: the visibility counts per pixel of views per pixel, the visibility counts per pixel of a virtual camera position, the visibility counts per pixel of a viewer interaction with the 3D content, and the visibility counts per pixel of a virtual camera orientation. The curated selection of the three-dimensional (3D) volumetric content generating module 224 generates the curated selection of the 3D volumetric content 238 based on the viewer telemetry data, using the visibility counts per pixel. In some embodiments, the distance function computing module 226 computes a distance function by employing a standard algorithm on a feature vector including at least one of three degrees of freedom of position, three degrees of freedom of orientation and a field of view and using the visibility counts per pixel. In some embodiments, the distance function is given by $$d\_ij = \text{alpha}*(l2\_\text{norm}(p\_i-p\_j)) + \text{beta}*(\text{dot\_product}(q\_i,q\_j)) + \text{gamma}*(f\_i-f\_j),$$

In some embodiments, alpha, beta, gamma are relative weighting parameters which are equal or greater than zero. In some embodiments, i and j refer to unique views, p_i is position i and p_j is position j. In some embodiments, p represents three degrees of freedom of position, q represents three degrees of orientation in an axis-angle encoding, and f represents the field of view. In some embodiments, p and q are 3 dimensional, l2_norm or dot_product are functions that take N dimensional vectors and return scalars.

The views clustering module 228 clusters one or more views of the 3D volumetric content 238 to obtain a set of clustered views that are different from one another between one or more canonical views, and that are similar to an original telemetry. In some embodiments, the views clustering module 228 clusters the one or more views of the 3D volumetric content 238 based on the distance function using the standard clustering algorithm. The curated selection of the three-dimensional (3D) volumetric content generating module 224 generates the curated selection of the 3D volumetric content 238 based on the set of clustered views.

In some embodiments, the clusters generating module 230 generates an initial set of clusters of views for refining the visibility histogram. In some embodiments, the scores defining module 232 defines a score for a view. In some embodiments, the score is the sum of the visibility counts per pixel for each pixel of the texture atlas visible from the view, divided by a number of pixels of the texture atlas visible in the view. The scores defining module 232 samples scores for nearby views of the 3D volumetric content 238 based on the visibility histogram to define the gradient as described herein. In some embodiments, the steps computing module 234 computes n steps of a gradient descent to generate the curated selection of the 3D volumetric content 238 based on the scores. In some embodiments, the n represents a whole number.

Figure 2D:
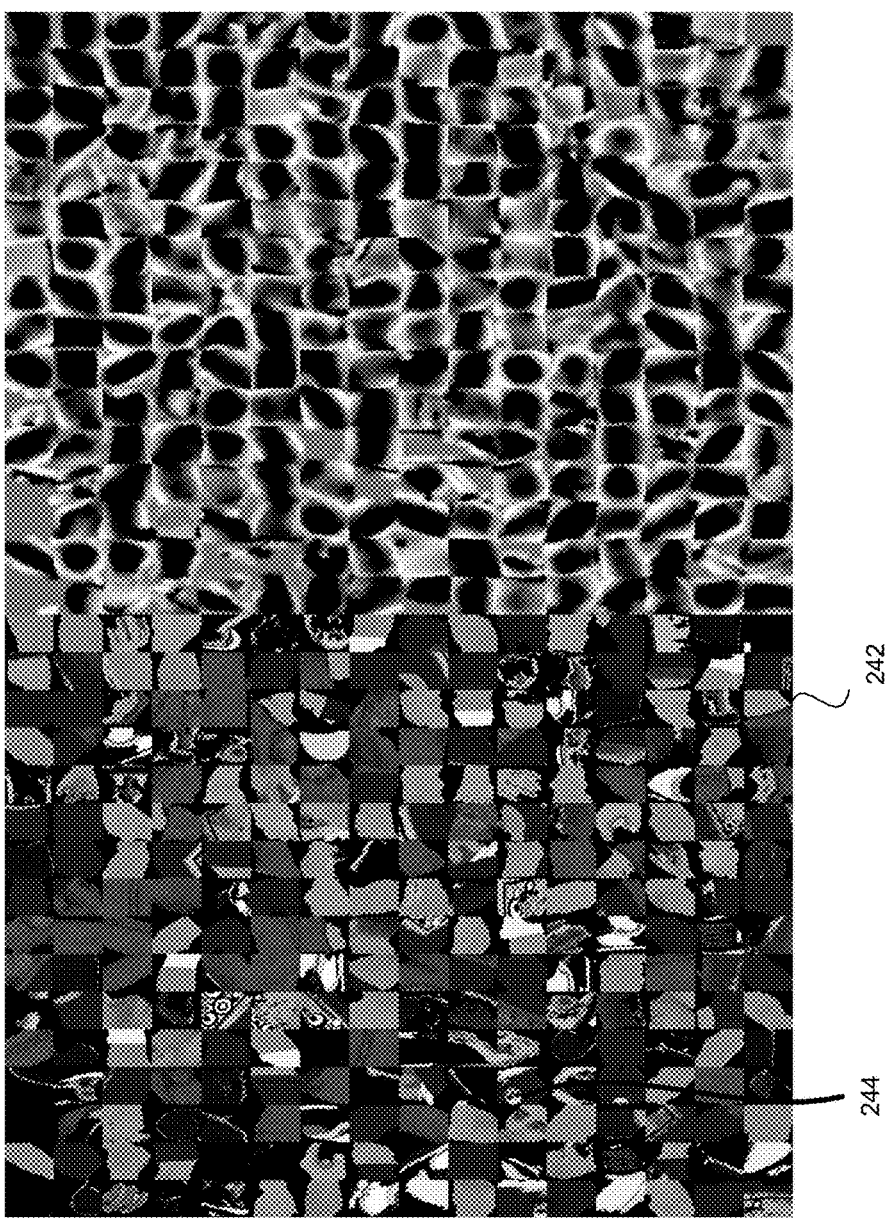
FIGS. 2C-2H are exemplary views that illustrate an example process of determining visibility of each pixel in a texture atlas using a volumetric video analytics server of FIG. 1 according to some embodiments herein.
Figure 2C:
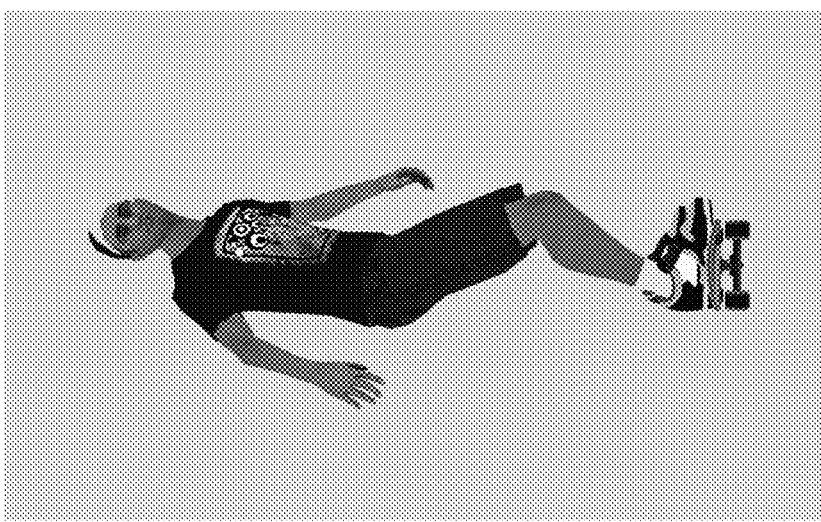

FIGS. 2C-2H are exemplary views that illustrate an example process of determining a visibility of each pixel in a texture atlas using the volumetric video analytics server 114 of FIG. 1 according to some embodiments herein. FIG. 2C is a representation 207 of a 3D content, e.g., a 3D image of a skater at the one or more viewer devices 104A-N as viewed from one of multiple possible virtual camera positions. For the purpose of illustration, a 2D image, which is a representation of the 3D content as viewed from a specific virtual camera position is shown herein. In some embodiments, the 3D content, e.g., the 3D image of the skater is displayed in different perspectives at the one or more viewer devices 104A-N based on a position of a virtual camera, which is controlled/selected, by the one or more viewers 102A-N. The representation 207 depicts a right perspective view the skater based on a first position 240 of the virtual camera, which is controlled/selected, by the one or more viewers 102A-N. In some embodiments, the one or more viewers 102A-N may change a position of the virtual camera using a mouse, a key board or a touch screen of the one or more viewer devices 104A-N. In some embodiments, the one or more views are based on the position of the virtual camera.

FIG. 2D is a representation 209 that depicts a RGB texture atlas image 242 that corresponds to each valid pixel associated with each frame of the 3D content for the first position 240 of the virtual camera according to some embodiments herein. The volumetric video analytics server 114 determines a visibility of each pixel in the texture atlas associated with the 3D content, e.g., the 3D image of the skater based on a viewer telemetry data. The volumetric video analytics server 114 assigns a unique color, e.g., visible pixels in white color and invisible pixels in black color, to each valid pixel associated with each frame of the 3D in the visibility texture atlas based on the first position 240 of the virtual camera. For example, a visible texture atlas 244 that corresponds a skull printed on a cap of the skater is invisible for the first position 240 of the virtual camera.

Figure 2E:

FIG. 2E is a Boolean lookup table 211 having a determined visibility of each pixel in the texture atlas that is stored in the database 203 of the volumetric video analytics server 114 of FIG. 1 for the first position 240 of the virtual camera according to some embodiments herein. The volumetric video analytics server 114 stores the determined visibility of each pixel in the texture atlas in the Boolean lookup table 211. In some embodiments, the Boolean lookup table 211 has the same size as the texture atlas. In some embodiments, size is a number of pixels in the texture atlas. In some embodiments, a number of cells (unique combination of row and column) in the Boolean lookup table 211 corresponds to the number of pixels. In some embodiments, the volumetric video analytics server 114 may assign 1 or 0 Boolean values for the visible pixels and the invisible pixels respectively. In some embodiments, the skull on the cap is invisible the first position 240 of the virtual camera, so in the Boolean lookup table 211, the pixels corresponding to the skull in the cap in the visible texture atlas 244 are represented by 0 values.

Figure 2G:
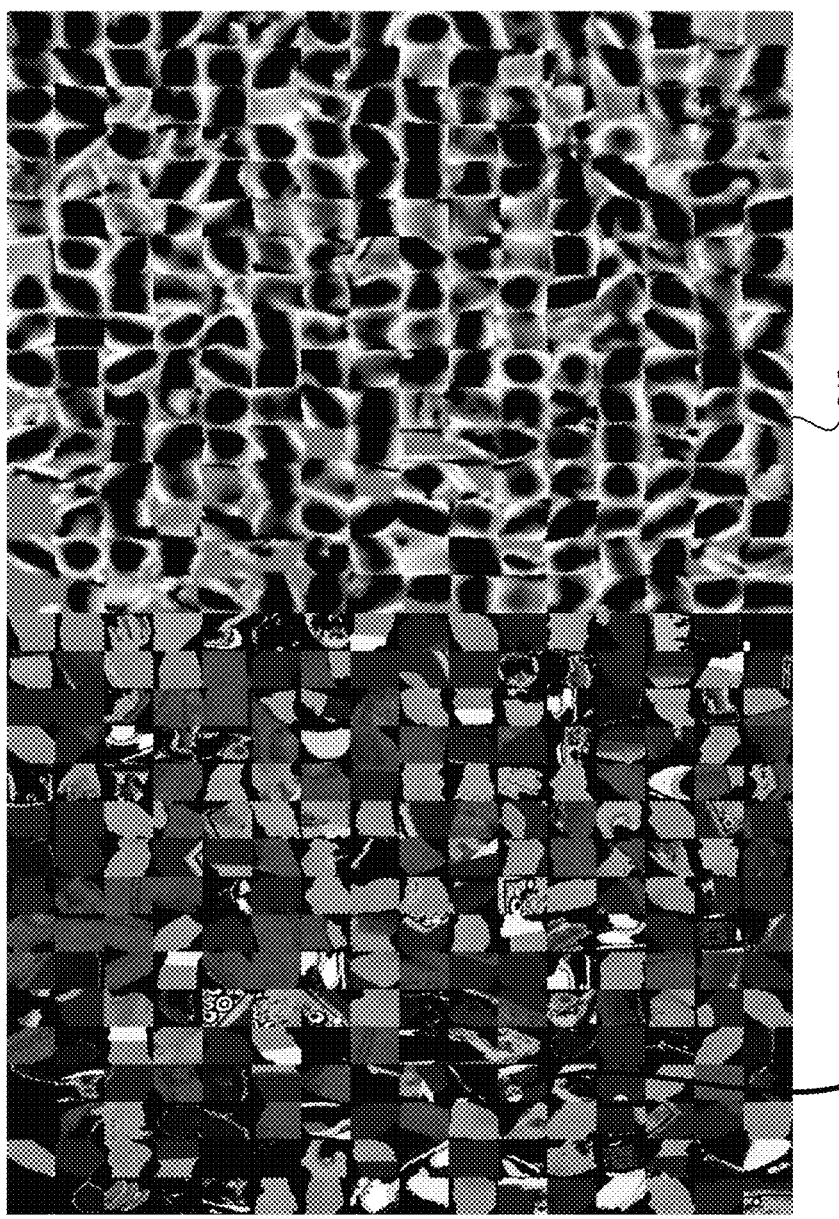
Figure 2F:

FIG. 2F is a representation 213 of the 3D content, e.g., the 3D image of skater at the one or more viewer devices 104A-N according to some embodiments herein. The representation 213 depicts a left perspective view the skater based on a second position 246 of the virtual camera, which is controlled/selected, by the one or more viewers 102A-N.

FIG. 2G is a representation 215 that depicts a RGB texture atlas image 248 that corresponds to each valid pixel associated with each frame of the 3D content for the second position 246 of the virtual camera according to some embodiments herein. The volumetric video analytics server 114 determines the visibility of each pixel in the texture atlas associated with the 3D content, e.g., the 3D image of the skater based on the viewer telemetry data. The volumetric video analytics server 114 assigns the unique color, e.g., the visible pixels in white color and the invisible pixels in black color, to each valid pixel associated with each frame of the 3D in the visibility texture atlas based on the second position 246 of the virtual camera. For example, the visible texture atlas 244 corresponds to the skull printed on the cap of the skater is visible for the second position 246 of the virtual camera.

Figure 2H:

FIG. 2H is a Boolean lookup table 217 having the determined visibility of each pixel in the texture atlas that is stored in the database 203 of the volumetric video analytics server 114 of FIG. 1 for the second position 246 of the virtual camera according to some embodiments herein. The volumetric video analytics server 114 stores the determined visibility of each pixel in the texture atlas in the Boolean lookup table 217. In some embodiments, the skull on the cap is visible the second position 246 of the virtual camera, so in the Boolean lookup table 217, the pixels corresponding to the skull in the cap in the visible texture atlas 244 are represented by 1 values.

The viewer telemetry data is aggregated and the visibility histograms are generated for a plurality of views (e.g., potentially millions of views) and virtual camera positions to derive insights on a most popular virtual camera position, virtual camera orientation, how the one or more viewers 102A-N interact with the 3D content (including pause, skip etc.) corresponding to different demographics. One such insight may be that a percentage of viewers may focus on virtual camera positions that enable them to view a skater's face, whereas another percentage may focus relatively more on the skull image on the skater's cap instead of on the skater's face. Based on these analytics and insights that are derived from analytics, the volumetric analytics server 114 or the analyst 118 who views data analytics on the volumetric analytics server 114 may determine an optimum placement region of a logo of a sponsor (e.g. on the cap, on the t-shirt near the skater's chest etc.).

Figure 3B:
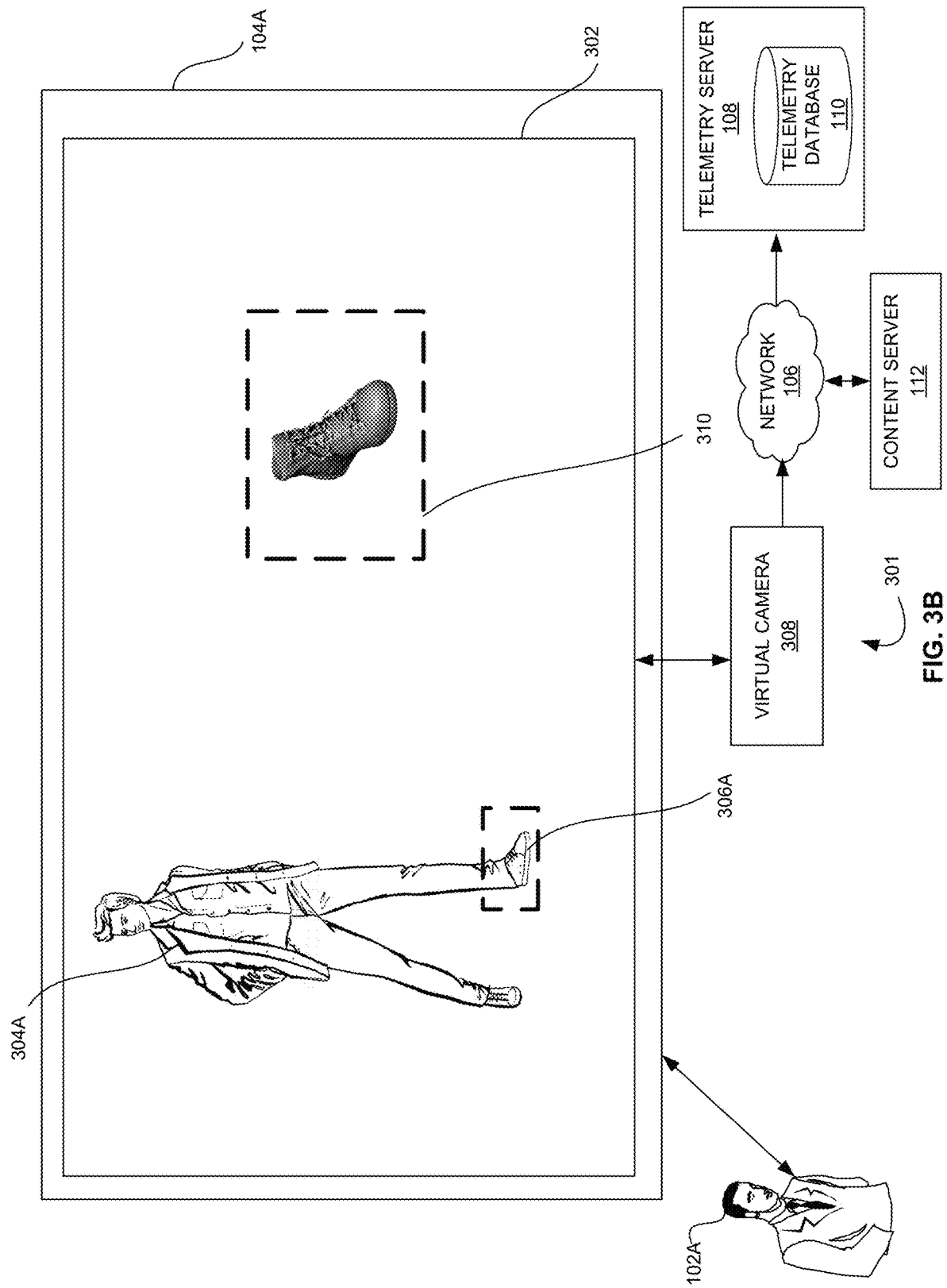
Figure 3C:
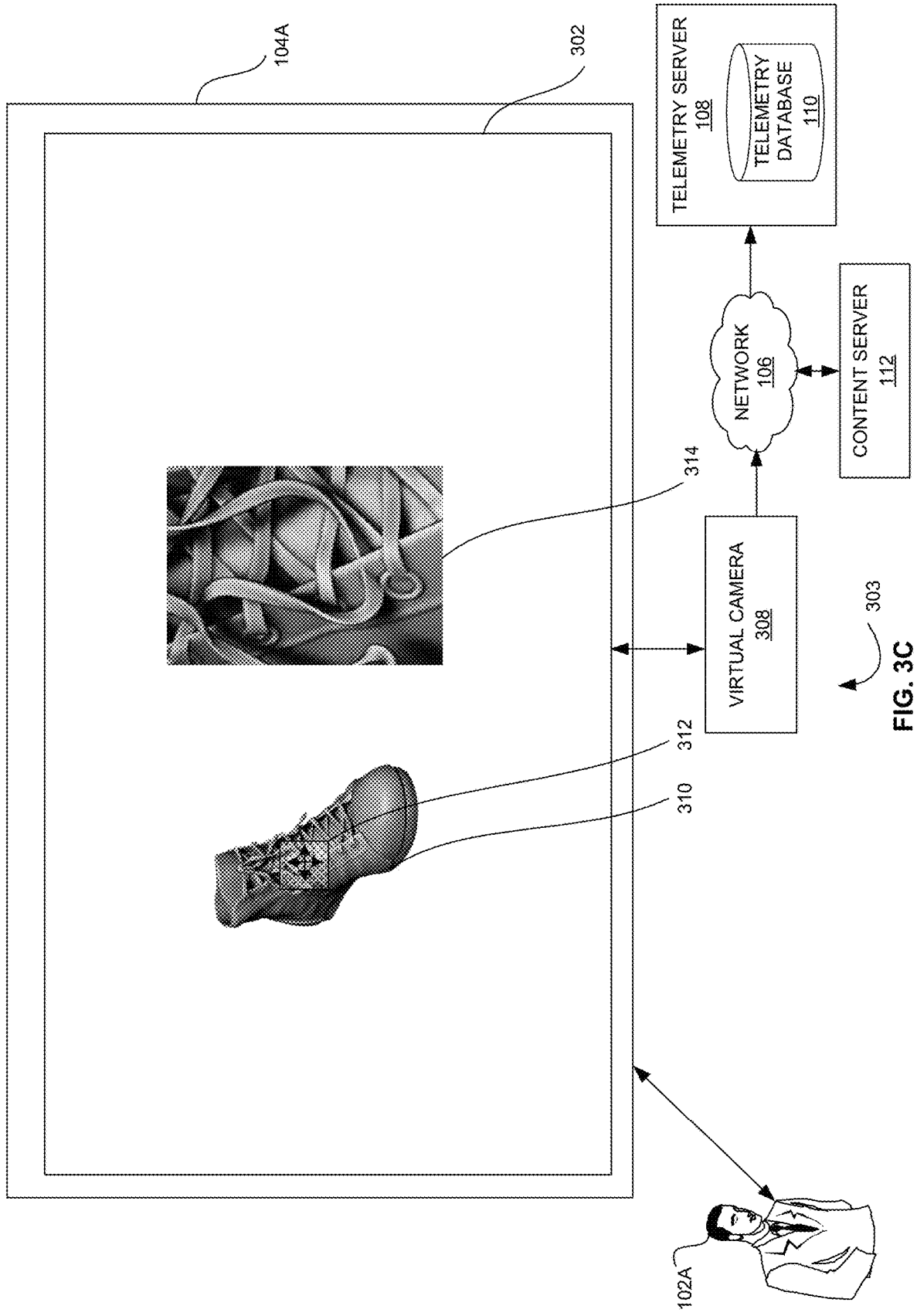

FIGS. 3A-3C exemplarily illustrates an example process of capturing a viewer telemetry data based on a user interaction and displaying a 3D content 302, according to some embodiments herein. FIG. 3A is a user interface view 300 that depicts a viewer 102A accessing a 3D content at a viewer device 104A according to some embodiments herein. In some embodiments, the content server 112 delivers the 3D content to the viewer device 104A associated with the viewer 102A through the network 106. In some embodiments, the viewer 102A may access the 3D content in an ecommerce platform, e.g., Amazon.com. The content server 112 may display the 3D content 302 corresponding to the search by the viewer 102A. The content server 112 may display the 3D content 302 may images of the shoes 306A-N that are worn by models 304A-N. In some embodiments, a virtual camera 308 may capture the viewer telemetry data describing and recording an interaction of the viewer 102A with the 3D content 302. For example, the viewer 102A may click the shoes 306A-N to get details, e.g., price, size, etc. of the shoes 306A-N and such interaction is captured by the virtual camera 308 and sent via the network 106 to the telemetry server 108. The telemetry server 108 captures the viewer telemetry data of the viewer 102A of the 3D content from the viewer device 104A. In some embodiments, the telemetry server 108 stores the viewer telemetry data at the telemetry database 110.

FIG. 3B is a user interface view 301 that depicts the viewer 102A may click a shoe 306A to view the shoe 306A in zoomed in view 310 and to get details, e.g., price, size, etc. of the shoe 306A according to some embodiments herein. In some embodiments, the content server 112 may display the zoomed in view 310 of the shoe 306A and the details, e.g., the price, the size, etc., of the shoe 306A to the viewer 102A. In some embodiments, the virtual camera 308 may capture the viewer telemetry data describing and recording an interaction of the viewer 102A with the 3D content 302, e.g., the viewer 102A may click the shoe 306A and such interaction is captured by the virtual camera 308 and sent via the network 106 to the telemetry server 108.

FIG. 3C is a user interface view 303 that depicts the viewer 102A may move a cursor 312 on the zoomed in view 310 of the shoe 306A to view the zoomed in view 310 of the shoe 306A in a particular angle 314 according to some embodiments herein. The content server 112 may display the particular angle 312 to the viewer 102A based on an orientation of view that is selected by the viewer 102A. The virtual camera 308 may capture the viewer telemetry data corresponding to at least one of visibility counts per pixel, data describing intrinsic camera parameters and extrinsic camera parameters based on an activity of the viewer 102A, e.g., viewing the shoe 306A from various angles, e.g., a front view, a right side view, a left side view, etc. and such interaction is captured by the virtual camera 308 and sent via the network 106 to the telemetry server 108.

The virtual camera 308 may capture the viewer telemetry data including the orientation of view of the shoe 306A selected by the viewer 102A and transmits the viewer telemetry data to the telemetry server 108 through the network 106. The volumetric video analytics server 114 captures the 3D content from the content server 112 and corresponding viewer telemetry data stored in the telemetry database 110 of the telemetry server 108 to perform at least one of generating the three-dimensional (3D) volumetric video 236 with an overlay representing visibility counts per pixel and generating the curated selection of the three-dimensional (3D) volumetric content 238 based on the viewer telemetry data.

Figure 4A:
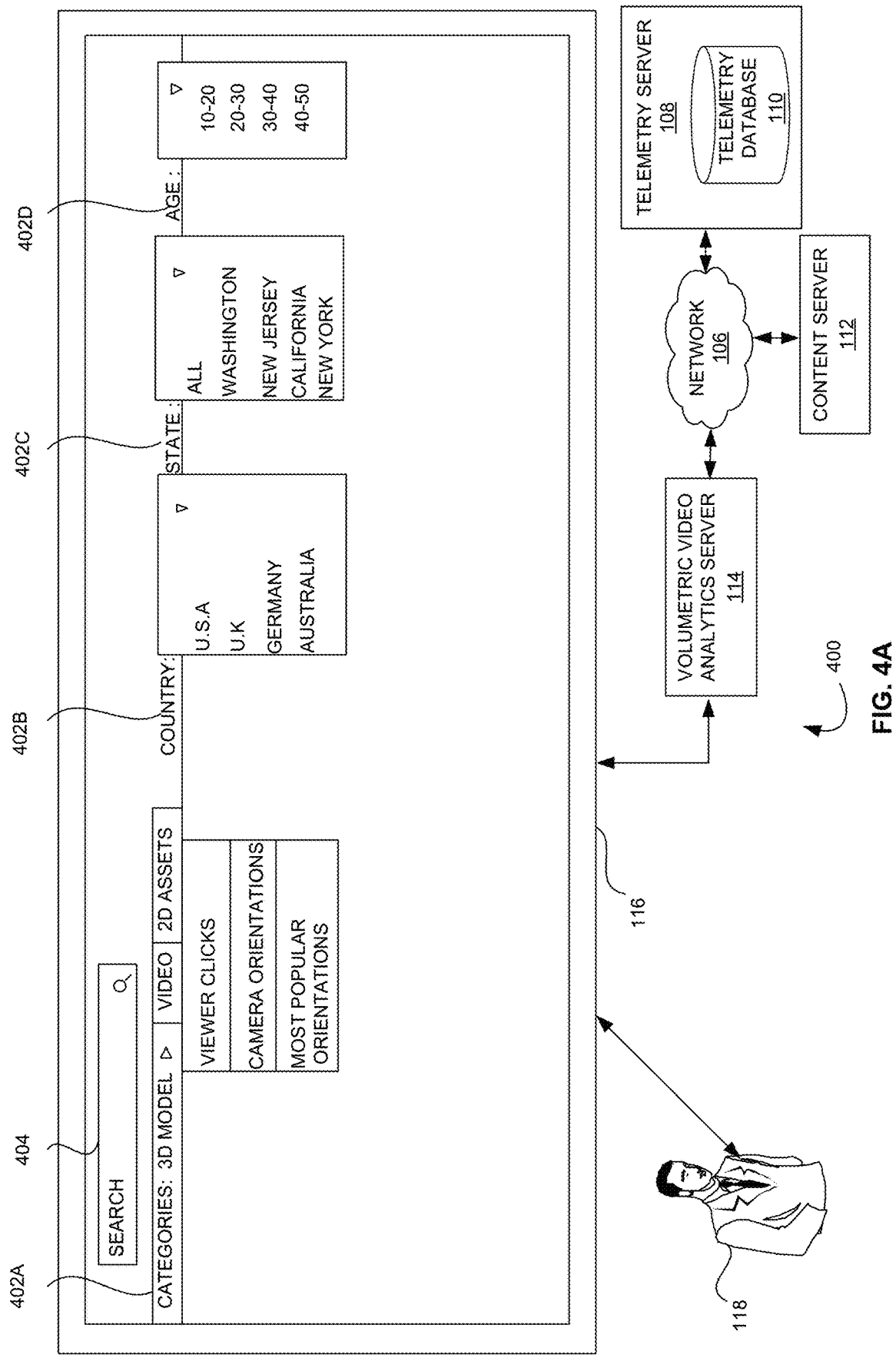
FIGS. 4A-4D exemplarily illustrate an example process of generating a heat map overlay for a 3D content displayed on an e-commerce platform based on selection by the viewer of the volumetric video analytics server of FIG. 1, according to some embodiments herein.

FIGS. 4A-4D exemplarily illustrate an example process of generating a heat map overlay for a 3D content displayed on an e-commerce platform based on selection of the viewer 102A according to some embodiments herein. FIG. 4A is a user interface 400 that depicts the analyst 118, e.g., a marketing team may request the volumetric video analytics server 114 to provide the heat map overlay for the 3D content displayed on the e-commerce platform, e.g. Amazon.com at the analyst device 116 according to some embodiments herein. In some embodiments, the analyst 118 may click categories 402A to select at least one of (i) a 3D model, (ii) a video and (iii) 2D assets. In some embodiments, the analyst 118 may select viewer clicks, camera orientations and most popular orientations for a product, e.g., a shoe, a bag, a watch, etc. In some embodiments, the analyst 118 may select a country 402B, e.g., U.S.A., U.K., Germany, Australia, a State 402C, e.g., Washington, New Jersey, California, New York, etc., and an age range 402D of the one or more viewers 102A-N, e.g., 10-20, 20-30, 30-40, 40-50, etc., years in specific demographics at the analyst device 116. In some embodiments, the analyst 118, e.g., a marketing personnel, may provide a selection of demographics via a search tab 404, which is displayed with the 3D content.

Figure 4B:
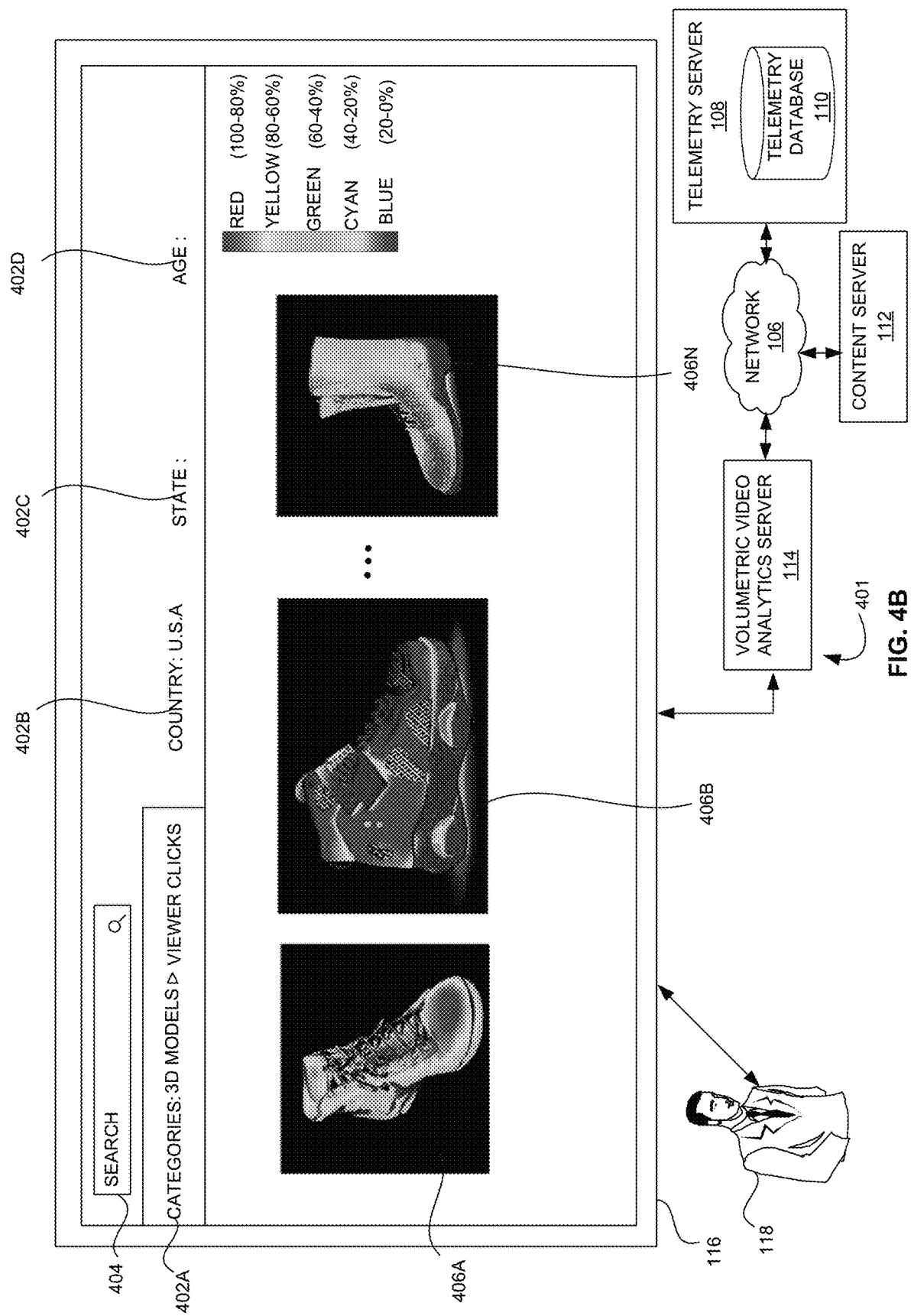

FIG. 4B is a user interface 401 that depicts the analyst 118, e.g., the marketing personnel may select the categories 402A as a 3D Model, such as viewer clicks, if the analyst 118 wants to view a heat map overlay for the 3D content displayed on an e-commerce platform at the analyst device 116 according to some embodiments herein. The volumetric video analytics server 114 generates the heat map with a unique RGB color per pixel based on a visibility counts per pixel of a texture atlas determined based on the viewer telemetry data corresponding to the demographics selection provided by the viewer 102A as described earlier along with FIGS. 2A and 2B. In some embodiments, the volumetric video analytics server 114 may enable drop-down menus such as country 402B, state 402C and Age 402D to the analyst 118 to select options.

Based on a selection of the analyst 118, e.g., the marketing personnel in the form of a selection of the drop down menus 402B, 402C and/or 402D at the analyst device 116, the volumetric video analytics server 114 generates the 3D contents, e.g., shoes 406A-N with the heat map indicative of the viewer telemetry data such as percentage of people that viewed a specific category of views in a particular angle as depicted in FIG. 4B. The heat map indicates a distribution of percentages of views at different points on the surface of the 3D contents, e.g., shoes 406A-N.

For example, the analyst 118 may select viewer clicks for the 3D content, e.g., 3D models such as shoes 406A-N and select the country 402B as U.S.A., the volumetric video analytics server 114 generates the 3D contents, e.g., the shoes 406A-N with the heat map indicative of the viewer telemetry data such as the percentage of people that viewed specific category of views in the particular angle. In some embodiments, the volumetric video analytics server 114 generates the 3D contents, e.g., shoes 406A-N with the heat map indicative of the viewer telemetry data in color-coded form (as shown in FIG. 4B). In some embodiments, the heat map indicative of the viewer telemetry data in the color-coded form (as shown in FIG. 4B) includes red, yellow, green, cyan and blue colors. In some embodiments, a legend which shows percentage ranges of views corresponding to different colors used in the heatmap. In some embodiments, the percentage ranges of views (100 to 80%) corresponding to red color, the percentage ranges of views (80 to 60%) corresponding to yellow color, the percentage ranges of views (60 to 40%) corresponding to green color, the percentage ranges of views (40 to 20%) corresponding to cyan color, the percentage ranges of views (20 to 0%) corresponding to blue color.

In some embodiments, red color represents "hottest" points on the 3D content or areas with highest activity. In some embodiments, yellow and green colors represent areas with medium activity. In some embodiments, cyan and blue colors represent areas with lowest activity.

Figure 4C:
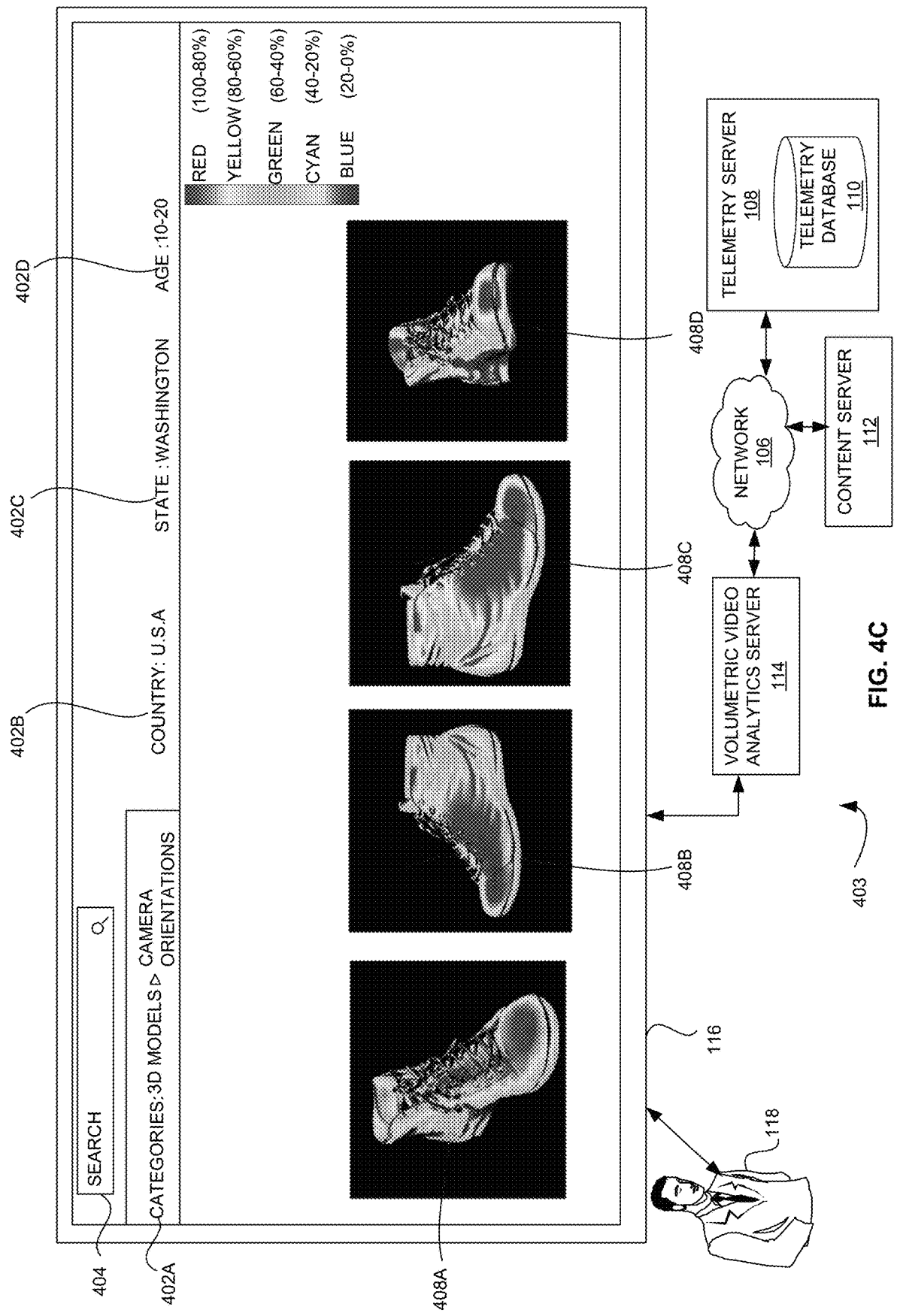

FIG. 4C is a user interface 403 that depicts selection of various camera orientations by the analyst 118, e.g., the marketing personnel to view the heat map overlay for the 3D content for one or more camera orientations for a product, e.g., the shoe 406A that are viewed by the viewer 102A from a particular country, e.g., U.S.A., a particular state 402C, e.g., Washington and Age, e.g., 10-20 at the analyst device 116 according to some embodiments herein. The volumetric video analytics server 114 displays one or more virtual camera orientations of the product, e.g., a perspective view 408A of the shoe 406A, a right-side view 408B, a left side view 408C and a front view 408D at the analyst device 116 associated with the analyst 118. In some embodiments, the volumetric video analytics server 114 displays the one or more camera orientations of the product with the heatmap in color-coded form (as shown in FIG. 4C).

The volumetric video analytics server 114 displays the one or more camera orientations of the product with the heatmap that includes values (%) based on the selection of the viewer 102A. In some embodiments, a legend which shows percentage ranges of views corresponding to different colors used in the heatmap. In some embodiments, the percentage ranges of views (100 to 80%) corresponding to red color, the percentage ranges of views (80 to 60%) corresponding to yellow color, the percentage ranges of views (60 to 40%) corresponding to green color, the percentage ranges of views (40 to 20%) corresponding to cyan color, the percentage ranges of views (20 to 0%) corresponding to blue color, where the percentage is indicative of percentage of the one or more viewers 102A-N of a particular demography that preferred to view the shoe 406A from one or more camera orientations, e.g., the perspective view 408A, the right-side view 408B, the left side view 408C and the front view 408D.

Figure 4D:
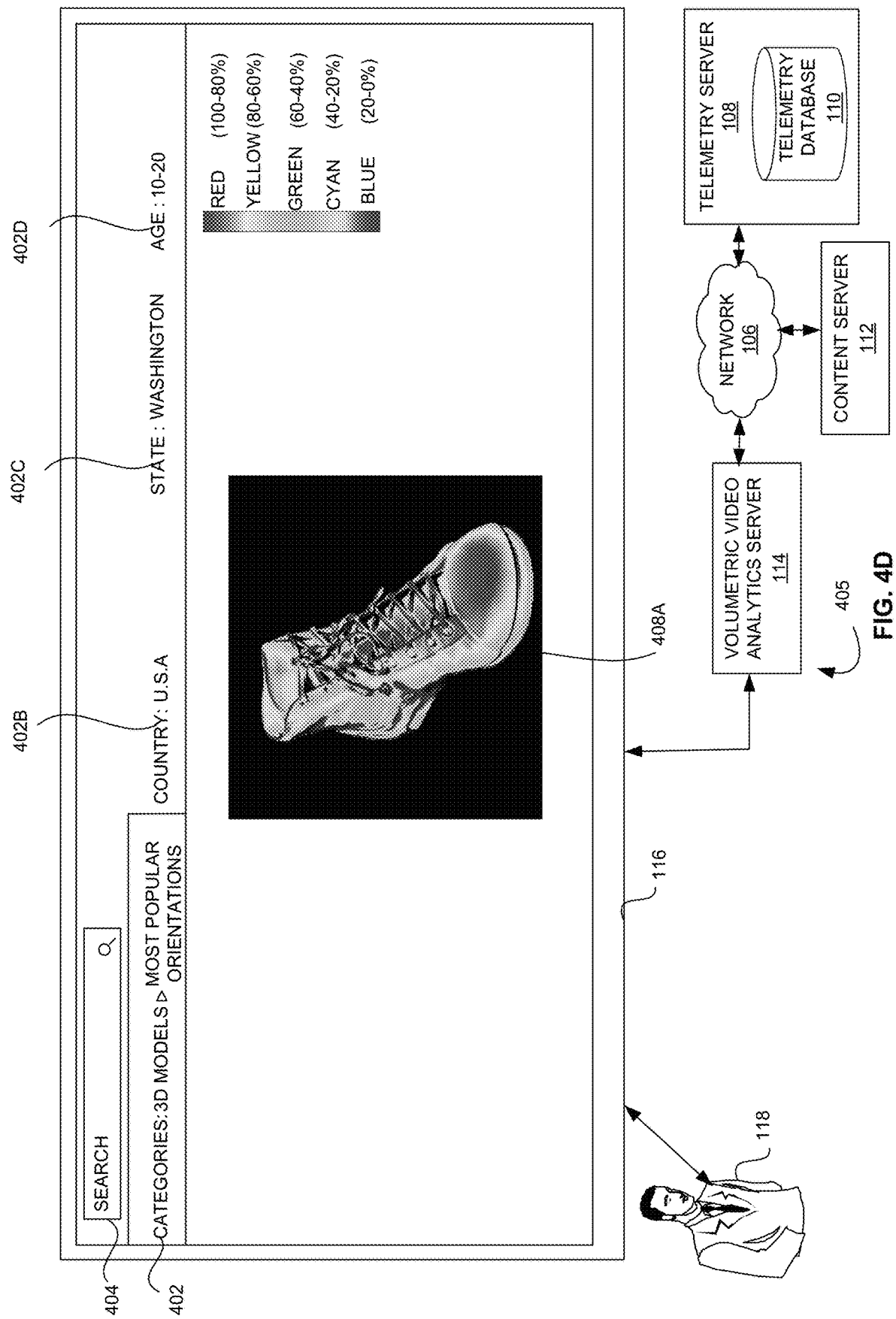

FIG. 4D is a perspective view 405 that depicts the shoe 406A rendered with the heat map overlay with different colors indicative of most popular orientations of view of the shoe 406A as viewed by the one or more viewers 102A-N from countries such as for example, the one or more viewers 102A-N from Washington, U.S.A., and in the age group, 10-20 according to some embodiments herein. The volumetric video analytics server 114 displays the most popular orientations of the product, e.g., the perspective view 408A of the shoe 406A at the analyst device 116. The heatmap that includes values (%) based on the selection of the one or more viewers 102A-N in one or more demographics. FIG. 4D also depicts heat maps indicative of the most popular orientations, e.g., the perspective view 408A of the one or more viewers 102A-N of the product.

In some embodiments, a legend which shows percentage ranges of views corresponding to different colors used in the heatmap. In some embodiments, the percentage ranges of views (100 to 80%) corresponding to red color, the percentage ranges of views (80 to 60%) corresponding to yellow color, the percentage ranges of views (60 to 40%) corresponding to green color, the percentage ranges of views (40 to 20%) corresponding to cyan color, the percentage ranges of views (20 to 0%) corresponding to blue color, where percentage is indicative of percentage of the one or more viewers 102A-N of a particular demography that preferred to view the shoe 406A from a particular orientation.

Figure 5A:
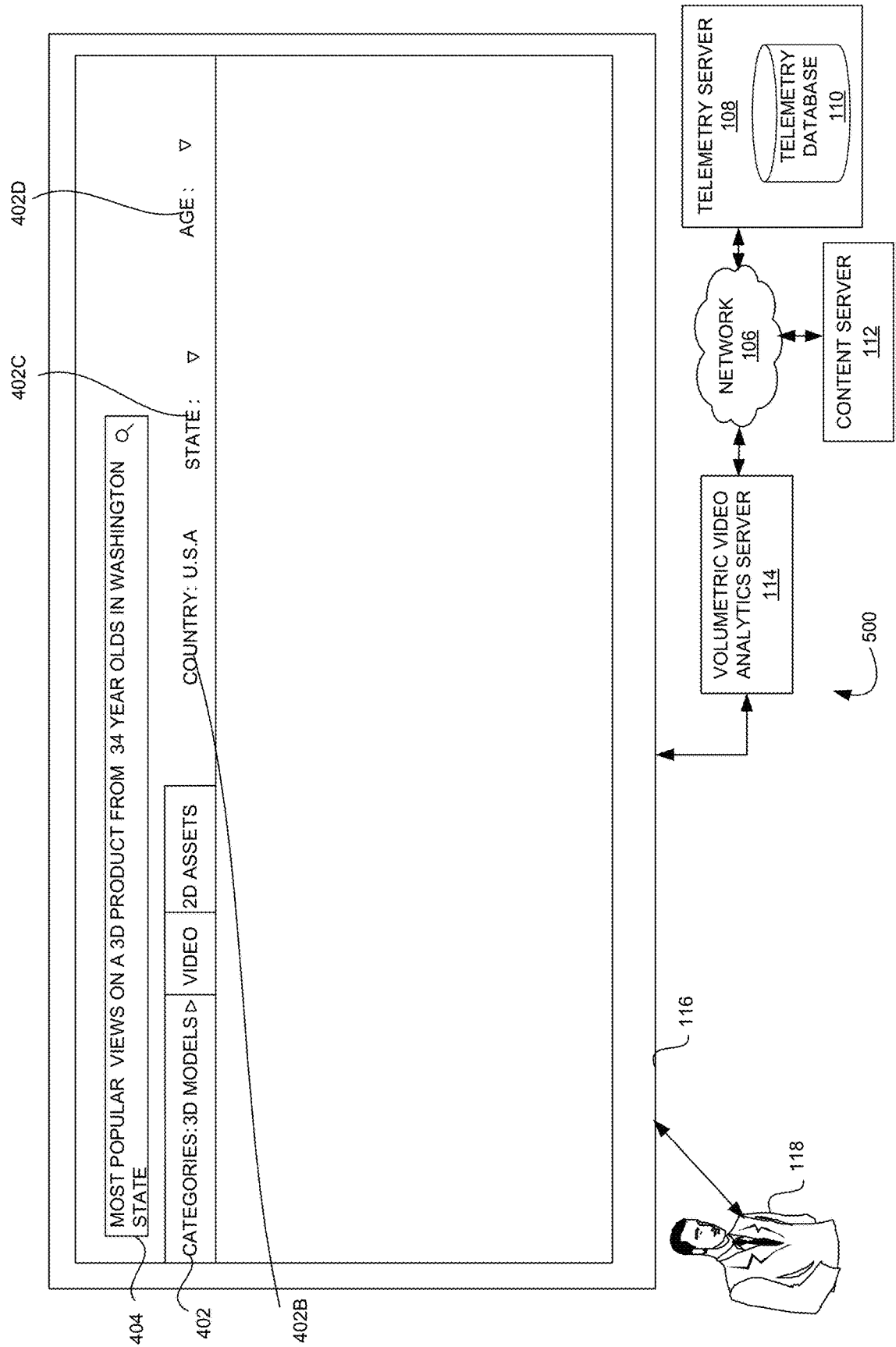
FIGS. 5A-5C exemplarily illustrates an example process of displaying most viewed surfaces at a most popular orientation based on selection of the viewer, according to some embodiments herein.
Figure 5B:
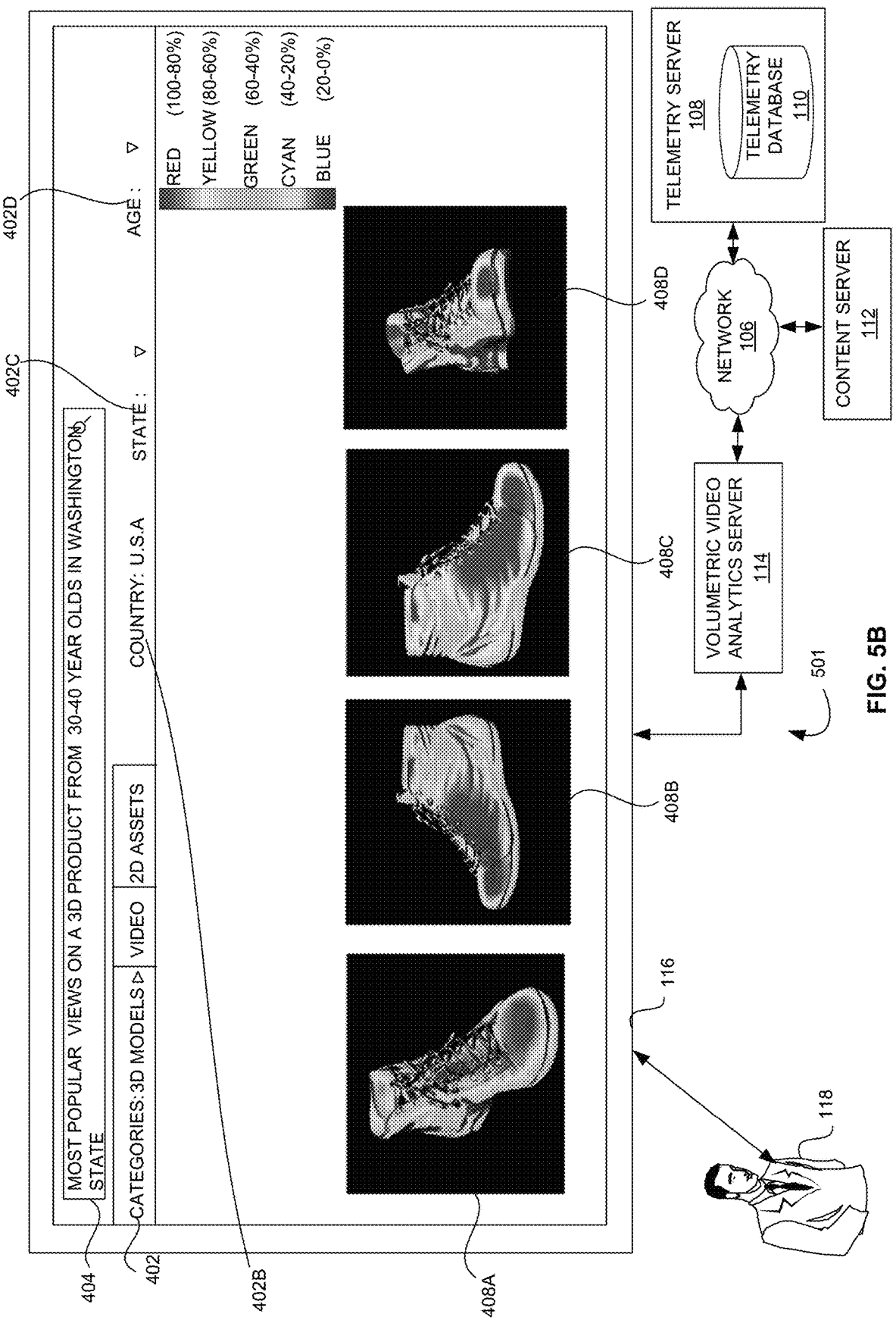
Figure 5C:
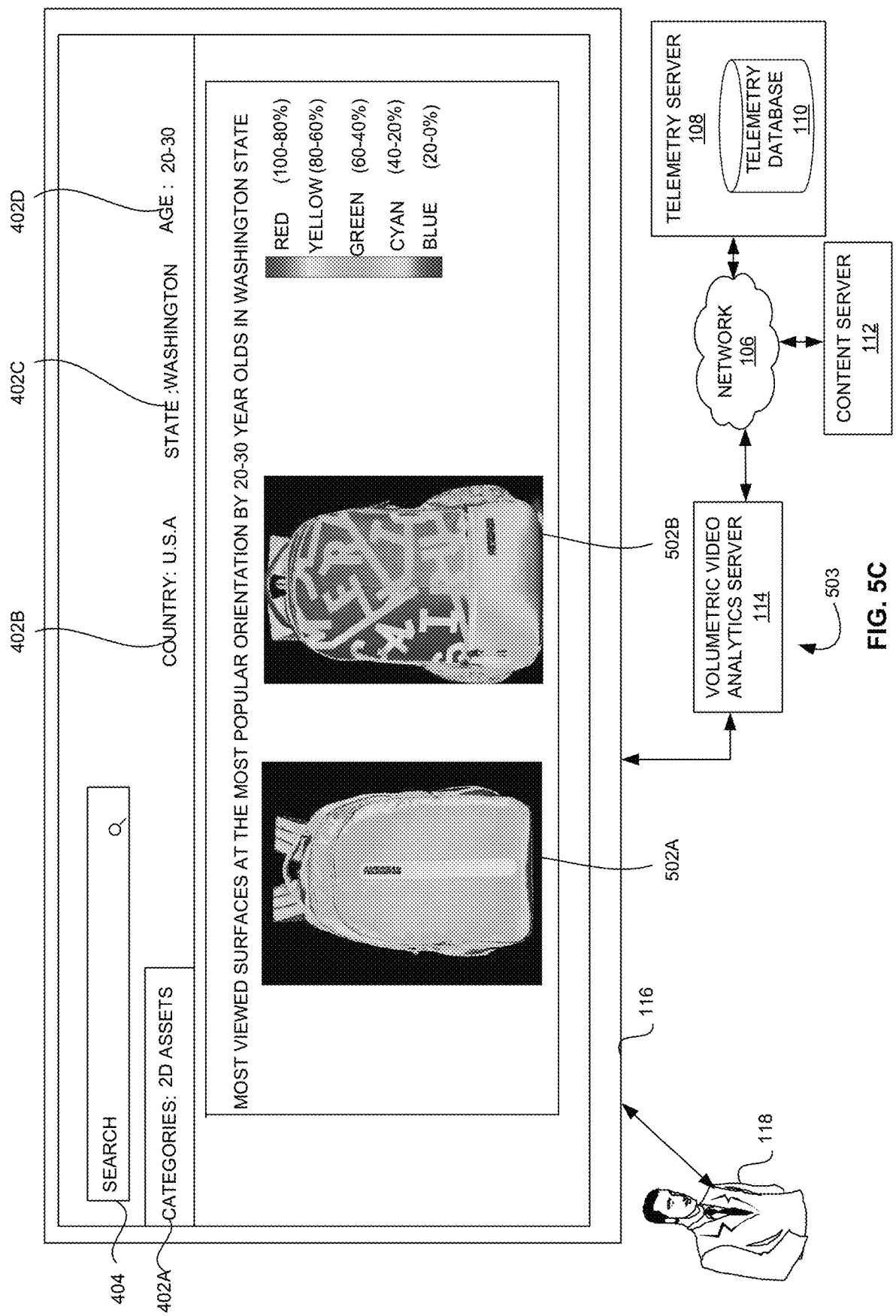

FIGS. 5A-5C exemplarily illustrates an example process of displaying most viewed surfaces at a most popular orientation based on selection of the viewer 102A as shown in FIG. 1, according to some embodiments herein. FIG. 5A is a user interface 500 that depicts the analyst 118, e.g., a marketing personnel, may request the volumetric video analytics server 114 for most popular views on a 3D product, e.g. a shoe, from 30-40-year olds, in Washington state, using the search tab 404 at the analyst device 116.

FIG. 5B is a user interface view 501 that depicts the volumetric video analytics server 114 may generate the most popular views on the 3D product, e.g. the shoe, from 30-40-year olds in Washington state based on the selection received from the viewer 102A and an available histogram associated with a viewer telemetry data according to some embodiments herein. The volumetric video analytics server 114 may render the most popular views on the 3D product such as the perspective view 408A, the right-side view 408B, the left-side view 408C and the front view 408D of the shoe 406A with a heat map indicative of the viewer telemetry data. In some embodiments, the volumetric video analytics server 114 displays the most popular views on the 3D product with the heatmap in color-coded form (as shown in FIG. 5B). In some embodiments, a legend which shows percentage ranges of views corresponding to different colors used in the heatmap. In some embodiments, the percentage ranges of views (100 to 80%) corresponding to red color, the percentage ranges of views (80 to 60%) corresponding to yellow color, the percentage ranges of views (60 to 40%) corresponding to green color, the percentage ranges of views (40 to 20%) corresponding to cyan color, the percentage ranges of views (20 to 0%) corresponding to blue color, where percentage is indicative of percentage of the one or more viewers 102A-N of the most popular views on the 3D product, e.g. the shoe, from 30-40 year olds in Washington state, e.g., the perspective view 408A, the right-side view 408B, the left side view 408C and the front view 408D.

FIG. 5C is a user interface view 503 that depicts the analyst 118, e.g., the marketing personnel may request the volumetric video analytics server 114 for 2D assets, e.g., most viewed surfaces at the most popular orientation by 20-30 Year olds in Washington state by selecting the categories 402A as the 2D assets according to some embodiments herein. In some embodiments, the 2D assets include 2D images, 2D movies, interaction key points, and camera positions per frame. The volumetric video analytics server 114 may generate the most viewed surfaces at the most popular orientation by 20-30 Year olds in Washington state with a heat map that includes the values (%) correspond to selections of the one or more viewers 102A-N as depicted in the user interface view 503 of FIG. 5C. For example, the volumetric video analytics server 114 may display the 2D assets, e.g., 2D images such as bags 502A-B in the most viewed surfaces at the most popular orientation, e.g., the perspective view of the bags 502A-B to the analyst device 116 associated with the analyst 118.

The volumetric video analytics server 114 may display the heat map indicative of the viewer telemetry data in the color-coded form, where percentage is indicative of percentage of the one or more viewers 102A-N of the most viewed surfaces at the most popular orientation by 20-30 Year olds in Washington state.

Figure 6A:
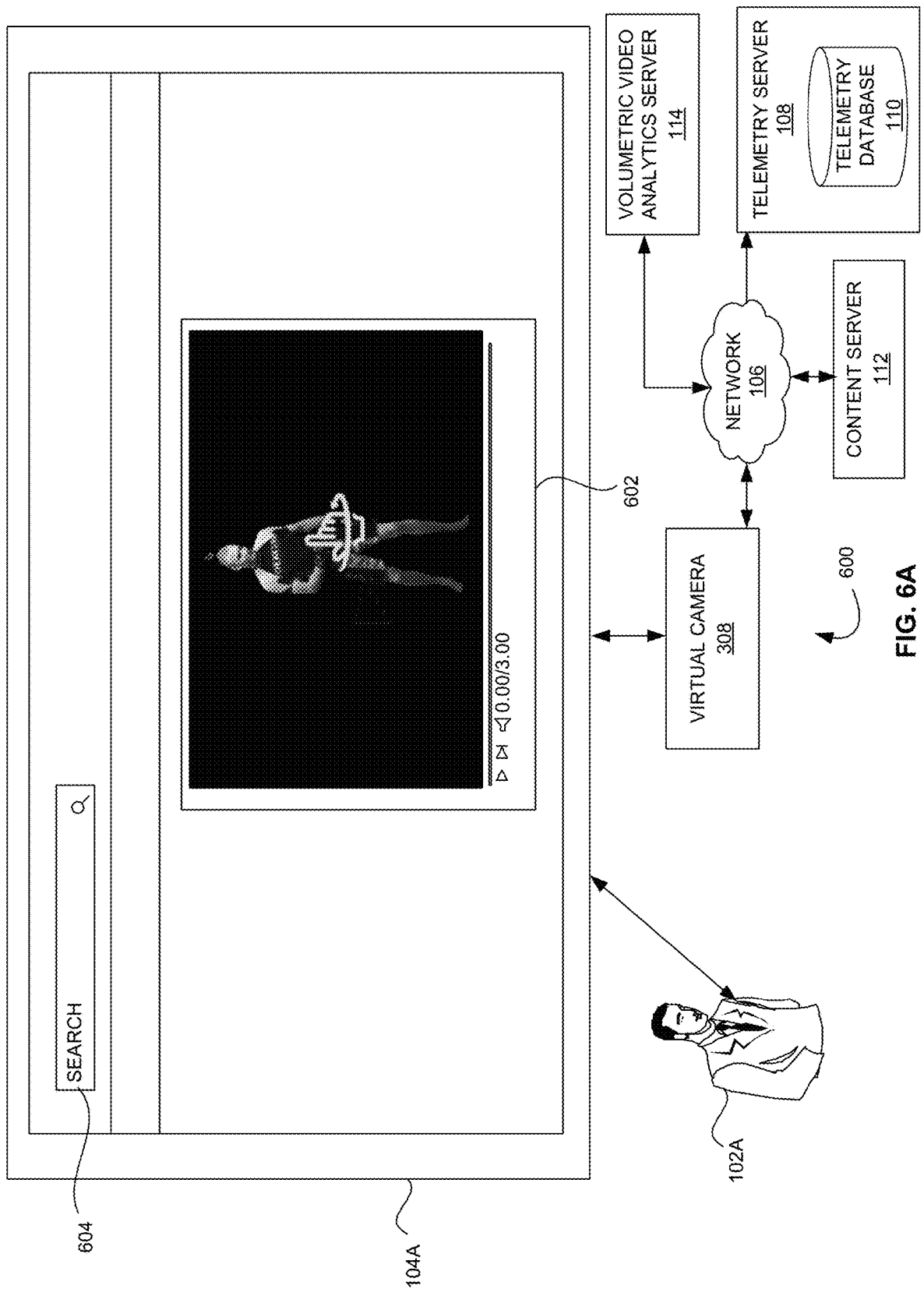
FIGS. 6A-6C exemplarily illustrate an example process of displaying a curated selection of a 3D volumetric content based on selection of the viewer, according to some embodiments herein.
Figure 6B:
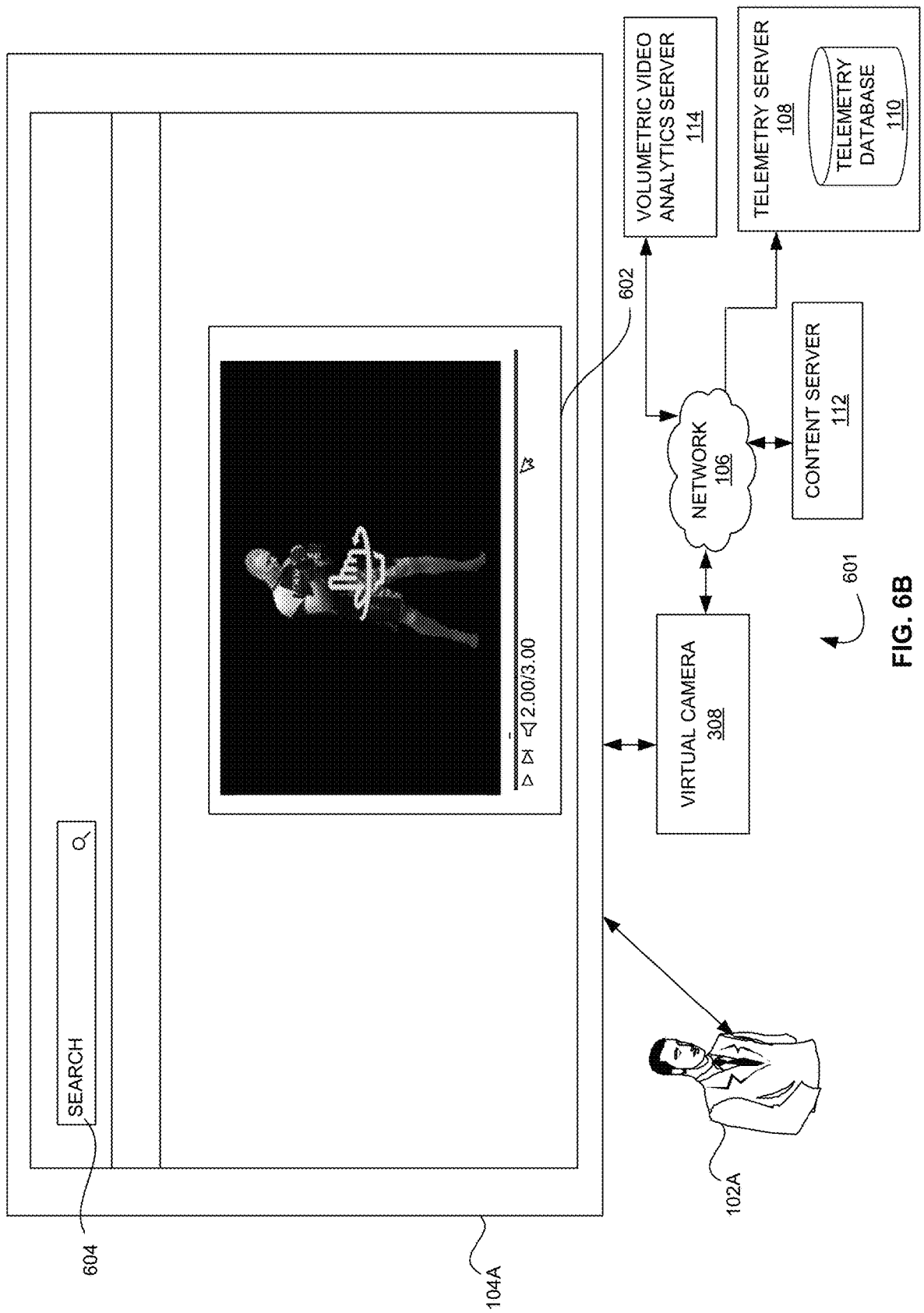
Figure 6C:
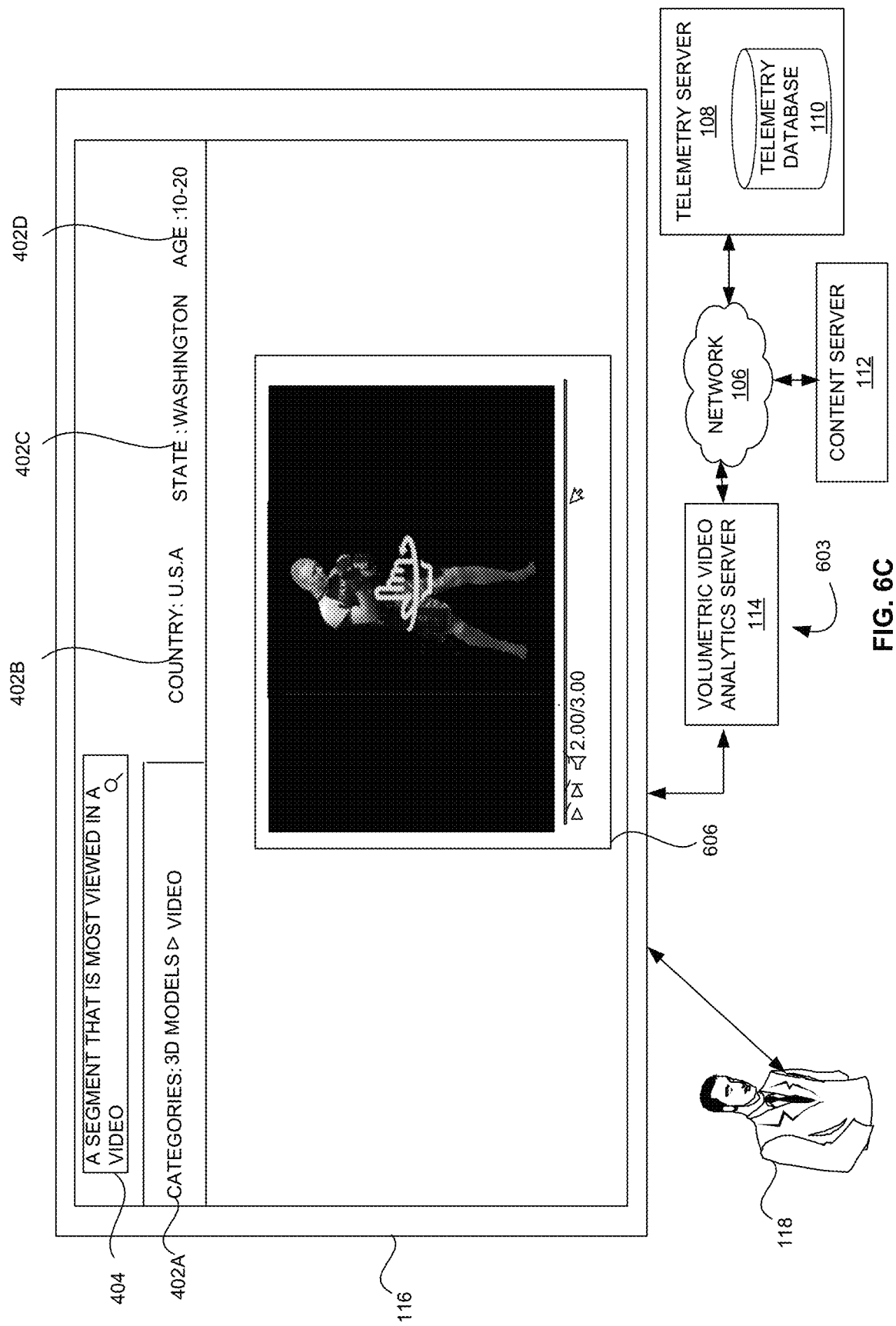

FIGS. 6A-6C exemplarily illustrate an example process of displaying a curated selection of a 3D volumetric content based on selection of the viewer 102A according to some embodiments herein. FIG. 6A is a user interface view 600 that depicts the viewer 102A may watch a volumetric video 602, e.g., the volumetric video of a boxer at the viewer device 104A of the viewer 102A according to some embodiments herein. The viewer 102A may (i) play the volumetric video 602 using a play icon, (ii) change the volumetric video 602 using a next icon and (iii) adjust volume for the volumetric video 602 using a volume icon. In some embodiments, the viewer 102A may search videos using a search tab 604.

FIG. 6B is a user interface view 601 depicts that the viewer 102A may skip a certain duration the volumetric video 602, e.g., the viewer 102A may play the volumetric video 602 from 2 minutes to 3 minutes using a cursor of the viewer device 104A according to some embodiments herein. The volumetric video analytics server 114 may display a duration of viewing of the volumetric video 602 based on the selection of the viewer 102A, e.g., may play the volumetric video 602 from 2 minutes to 3 minutes. The virtual camera 308 may capture a viewer telemetry data that includes data describing and recording an interaction of the viewer 102A with the volumetric video 602 and communicate the viewer telemetry data to the telemetry server 108 through the network 106. In some embodiments, the telemetry server 108 stores the viewer telemetry data at the telemetry database 110. The volumetric video analytics server 114 captures the 3D volumetric content, e.g., the volumetric video 602 from the content server 112 and corresponding viewer telemetry data of the 3D volumetric content, e.g., the volumetric video 602 stored in the telemetry database 110 of the telemetry server 108. The volumetric video analytics server 114 may obtain demographic data associated with the viewer 102A from the content server 112. In some embodiments, the demographic data includes age, gender, a location, e.g., age 20-30, male, Washington, of the viewer 102A.

FIG. 6C is a user interface view 603 depicts the analyst 118 requests the volumetric video analytics server 114 for a segment that is most viewed in a video, e.g., the volumetric video 602 from a particular demographic, according to some embodiments herein. The volumetric video analytics server 114 generates a curated selection of the volumetric video 606 based on the viewer telemetry data if the analyst 118 requests the volumetric video analytics server 114 for the segment that is most viewed in an original video, e.g., the volumetric video 602. In some embodiments, the volumetric video analytics server 114 may automatically snip out middle third of the volumetric video 602 and display a portion, e.g., 2 minutes to 3 minutes of the volumetric video 602 if most of the viewers 102A-N from the particular demographic may skip frames in the middle of the volumetric video 602. In some embodiments, the volumetric video analytics server 114 may display the video, e.g., the curated selection of the volumetric video 606, e.g., 2 minutes to 3 minutes of the volumetric video 602 that is most viewed segment in the volumetric video 602 to the analyst 118. In some embodiments, the volumetric video 602 is curated by cutting out of the middle segment by the volumetric video analytics server 114 and the curated selection of the volumetric video 606, e.g., 2 minutes to 3 minutes is delivered to target viewers.

Figure 7A:
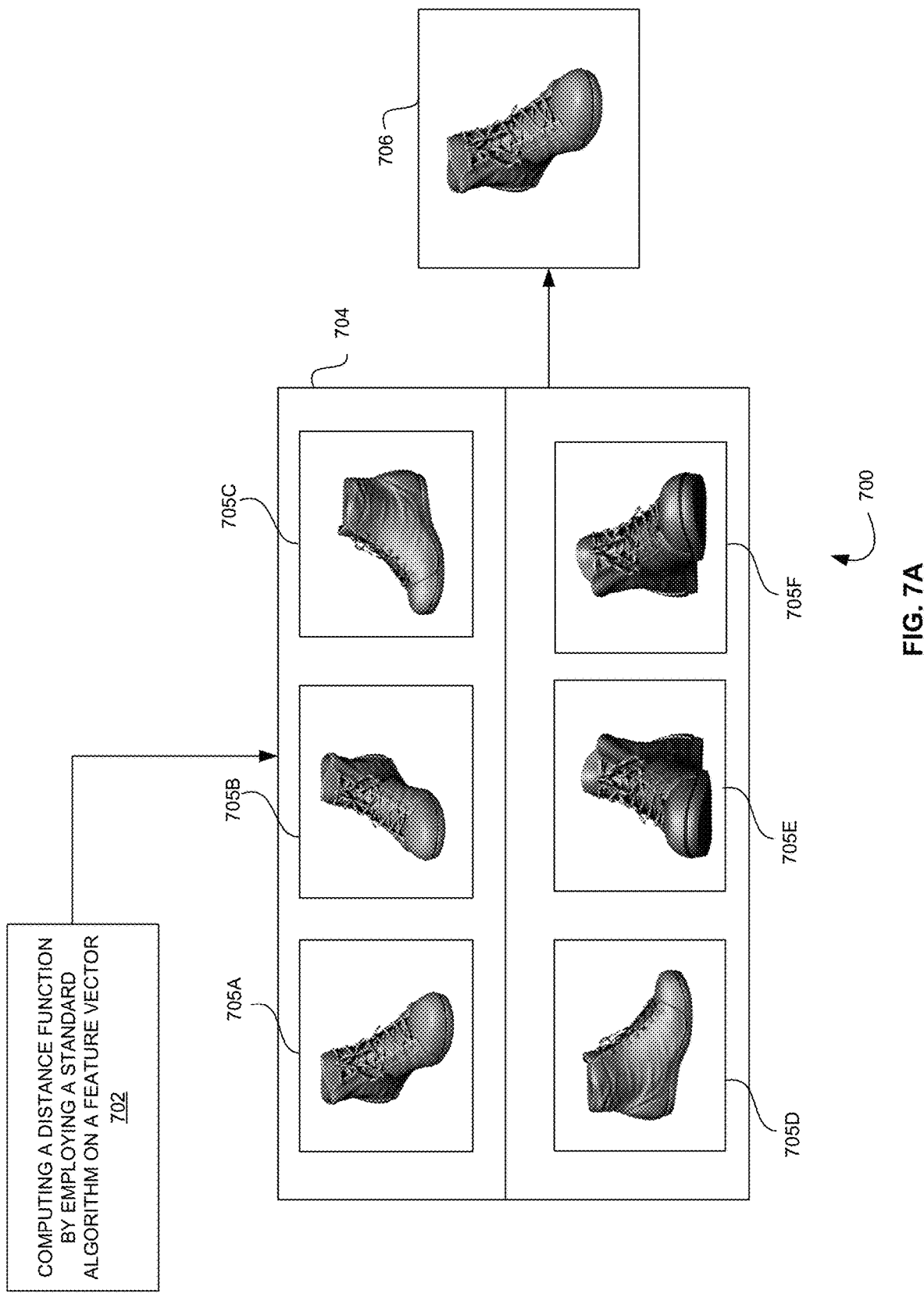
FIG. 7A is a block flow diagram that illustrates a process of generating a curated selection of a 3D volumetric content using the volumetric video analytics server, according to some embodiments herein.

FIG. 7A is a block flow diagram that illustrates a process 700 of generating a curated selection of a 3D volumetric content using the volumetric video analytics server 114 according to some embodiments herein. At step 702, the process 700 includes computing, using the volumetric video analytics server 114, a distance function by employing a standard algorithm on a feature vector including at least one of three degrees of freedom of position, three degrees of freedom of orientation and a field of view and using visibility counts per pixel. In some embodiments, the distance function is given by $$d\_ij = \text{alpha} * (l2\_\text{norm}(p\_i - p\_j)) + \text{beta} * (\text{dot\_product}(q\_i, q\_j)) + \text{gamma} * (f\_i - f\_j).$$

In some embodiments, alpha, beta, gamma are relative weighting parameters which are equal or greater than zero. In some embodiments, i and j refer to unique views, pi is position I and p_j is position j. In some embodiments, p represents three degrees of freedom of position, q represents three degrees of orientation in an axis-angle encoding, and f represents the field of view. In some embodiments, p and q are 3 dimensional, l2_norm or dot_product are functions that take N dimensional vectors and return scalars.

At step 704, the process 700 includes clustering one or more views of the 3D volumetric content, based on the distance function and using the standard clustering algorithm, to obtain a set of canonical views (705 A-F), e.g., a front view, a right-side view, a left-side view, and the like, of a shoe, that are different from one another but similar to an original telemetry. At step 706, the process 700 includes generating, using the volumetric video analytics server 114, the curated selection of the 3D volumetric content based on the set of clustered views 705A-F.

Figure 7B:
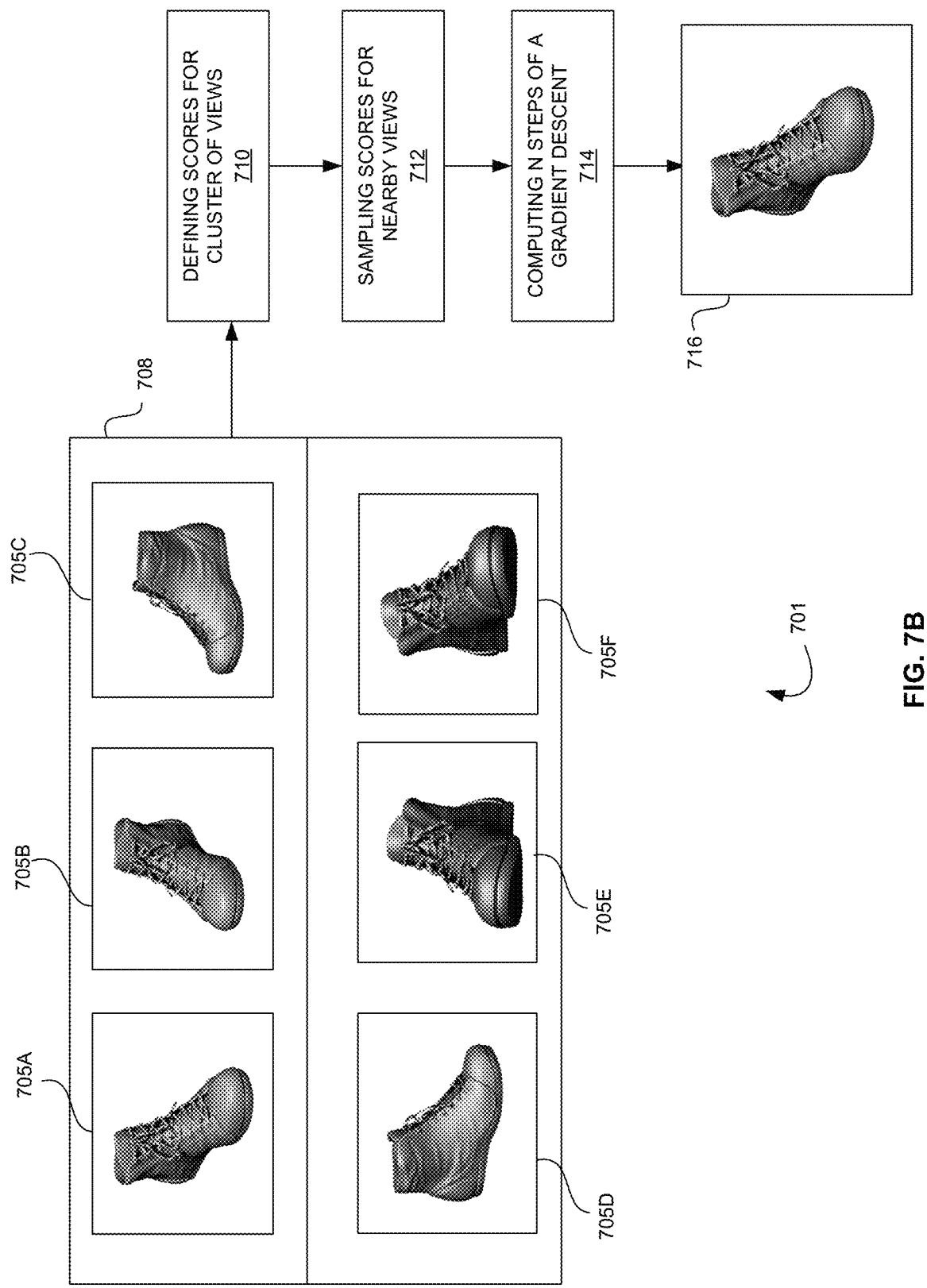
FIG. 7B is a block flow diagram that illustrates a process of defining scores for cluster of views of the 3D volumetric content and generating a curated selection of a 3D volumetric content using the volumetric video analytics server based on the scores of the cluster of views according to some embodiments herein.

FIG. 7B is a block flow diagram that illustrates a process 701 of defining scores for the cluster of views 705A-F of the 3D volumetric content and generating a curated selection of a 3D volumetric content using the volumetric video analytics server 114 based on the scores of the cluster of views according to some embodiments herein. At step 708, the process 701 includes generating the initial set of clusters of views 705A-F for refining using the visibility histogram. At step 710, the process 701 includes defining scores for the initial set of clusters of views 705 A-F. In some embodiments, a score is the sum of visibility counts per pixel for each pixel of a visible texture atlas from a view, divided by a number of pixels of the visible texture atlas in the view. At step 712, the process 701 includes sampling the scores for nearby views of the 3D volumetric content based on the visibility histogram to define a gradient. At step 714, the process 701 includes computing n steps of a gradient descent. At step 716, the process 701 includes generating, using the volumetric video analytics server 114, the curated selection 624 of the 3D volumetric content based on the scores of the initial set of clusters of views 705 A-F. In some embodiments, the n represents a whole number. In some embodiments, view 705F from the cluster of views 705A-F of the 3D volumetric content is selected for the curated selection 624 of the 3D volumetric content.

Figure 8:
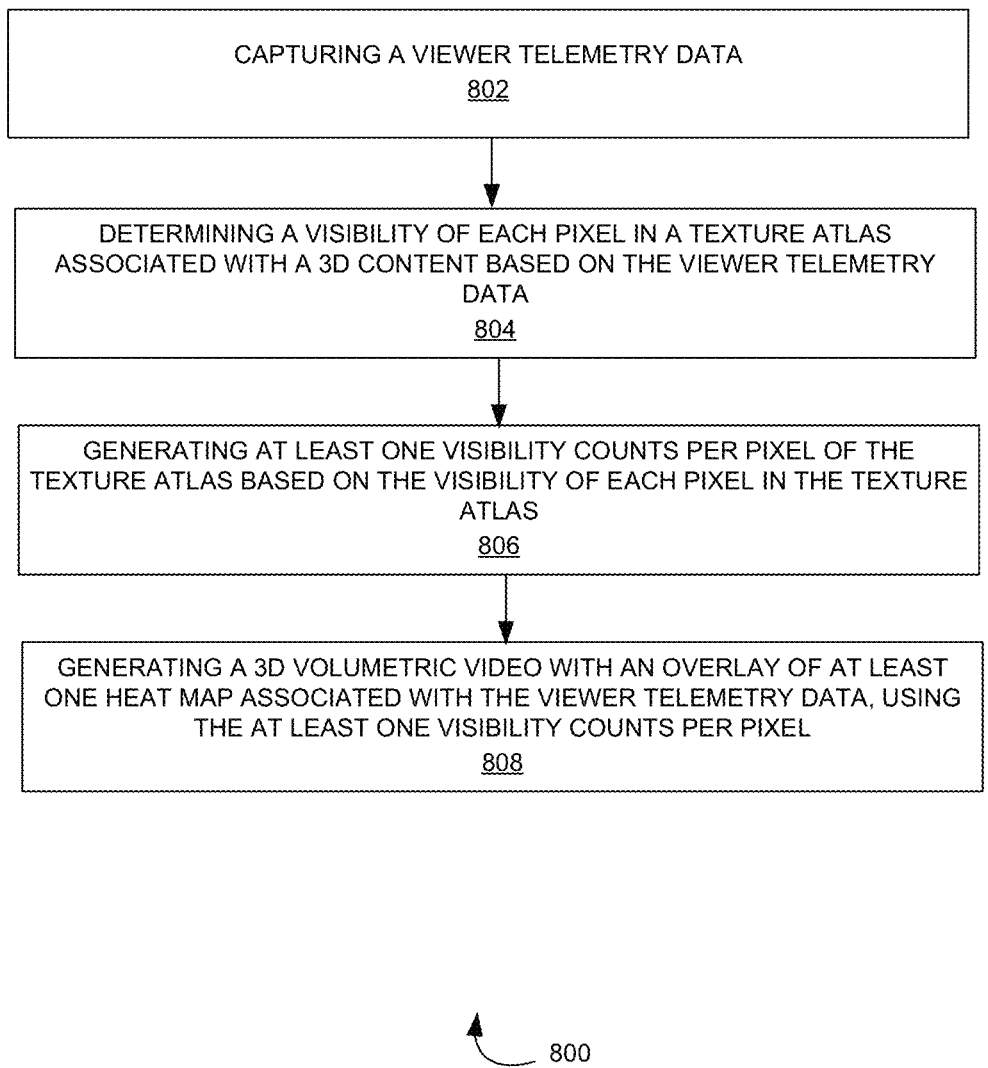
FIG. 8 is a flow diagram that illustrates a method of generating a three-dimensional (3D) volumetric video with an overlay representing visibility counts per pixel of a texture atlas, associated with a viewer telemetry data, according to some embodiments herein.

FIG. 8 is a flow diagram that illustrates a method 800 of generating the three-dimensional (3D) volumetric video 236 with an overlay representing visibility counts per pixel of a texture atlas, associated with a viewer telemetry data according to some embodiments herein. At step 802, the method 800 includes capturing the viewer telemetry data. In some embodiments, the volumetric video analytics server 114 captures the 3D content from the content server 112 and the viewer telemetry data of the one or more viewers 102A-N corresponding to the 3D content from the telemetry database 110 of the telemetry server 108. The viewer telemetry data corresponds to at least one of the visibility counts per pixel, data describing intrinsic camera parameters and extrinsic camera parameters and an associated time during the 3D content, data describing and recording a viewer interaction with the 3D content. At step 804, the method 800 includes determining a visibility of each pixel in a texture atlas associated with the 3D content based on the viewer telemetry data. At step 806, the method 800 includes generating a visibility counts per pixel of the texture atlas based on the visibility of each pixel in the texture atlas. The visibility counts per pixel of the texture atlas includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations. At step 808, the method 800 includes generating the 3D volumetric video 236 with the overlay of the heat map associated with the viewer telemetry data, using the visibility counts per pixel.

Figure 9:
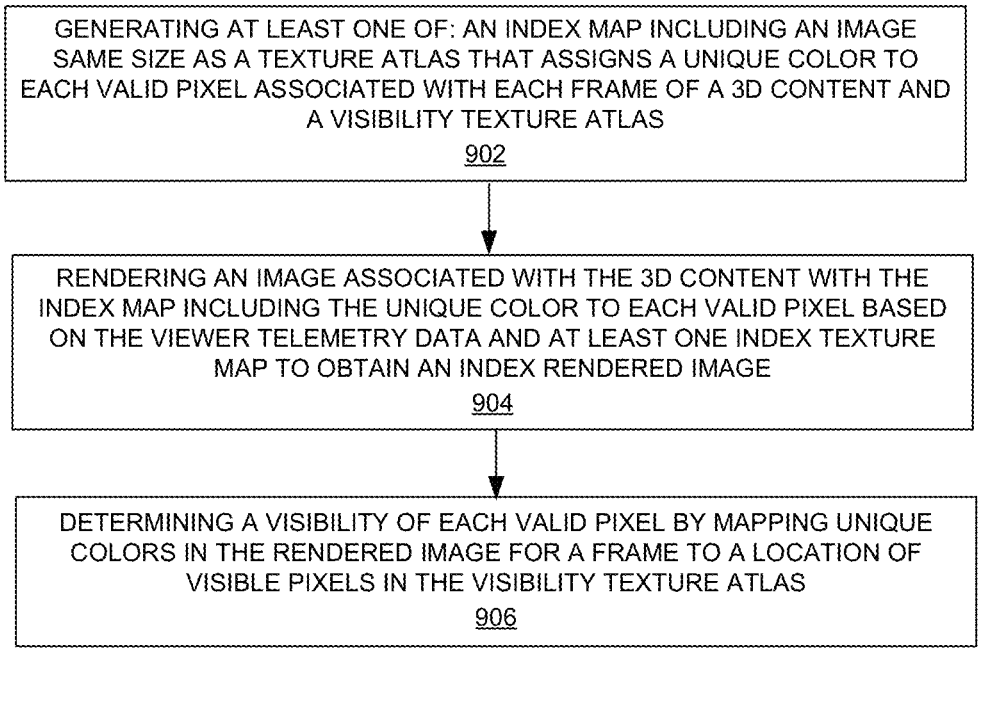
FIG. 9 is a flow diagram that illustrates a method of determining visibility of each pixel in a texture atlas associated with a 3D content, according to some embodiments herein.

FIG. 9 is a flow diagram that illustrates a method 900 of determining visibility of each pixel in a texture atlas associated with a 3D content according to some embodiments herein. At step 902, the method 900 includes generating at least one of: an index map including an image same size as that of a texture atlas that assigns a unique color to each valid pixel associated with each frame of the 3D content and the visibility texture atlas by initializing an image of the same size as the texture atlas to zero. At step 904, the method 900 includes rendering an image associated with the 3D content with the index map including the unique color to each valid pixel based on the viewer telemetry data and an index map to obtain an index rendered image. At step 906, the method 900 includes determining the visibility of each valid pixel by mapping unique colors in the rendered image for a frame to a location of visible pixels in the visibility texture atlas. In some embodiments, there is a one to one mapping between the unique colors per frame in the index map and the location of the visible pixels in the visibility texture atlas.

Figure 10:
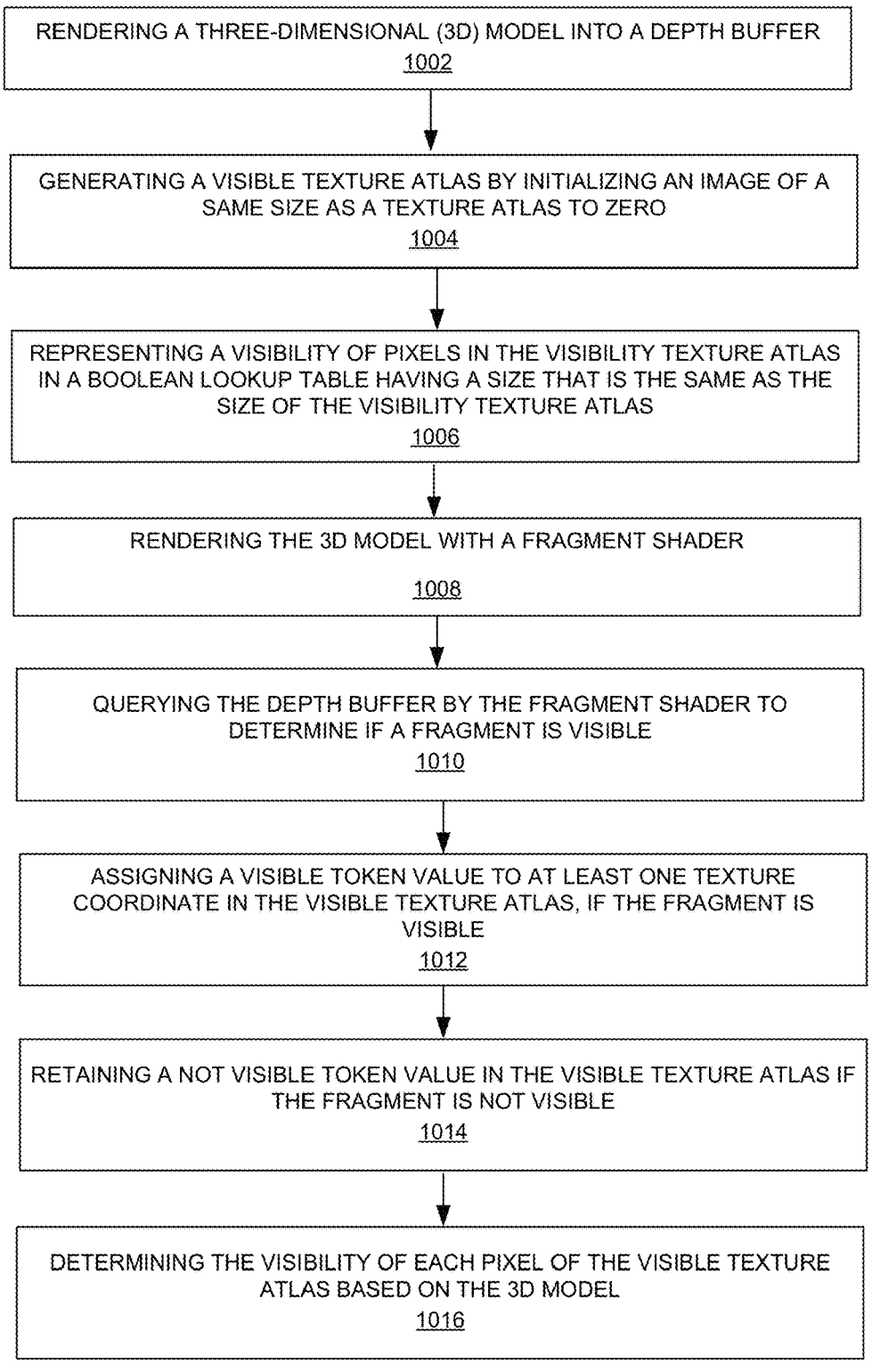
FIG. 10 is a flow diagram that illustrates a method of determining visibility of each pixel in a texture atlas associated with a 3D content, according to some embodiments herein.

FIG. 10 is a flow diagram that illustrates a method 1000 of determining visibility of each pixel in a texture atlas associated with a 3D content according to some embodiments herein. At step 1002, the method 1000 includes rendering a 3D model into a depth buffer. At step 1004, the method 1000 includes generating a visibility texture atlas by initializing an image of a same size as a texture atlas. At step 1006, the method 1000 includes representing a visibility of pixels in the visibility texture atlas in a boolean lookup table having a size that is the same as the size of the visibility texture atlas. In some embodiments, the boolean lookup table includes a not visible token value corresponding to each pixel in the visibility texture atlas. At step 1008, the method 1000 includes rendering the 3D model with a fragment shader. At step 1010, the method 1000 includes querying the depth buffer by the fragment shader to determine if a fragment is visible. At step 1012, the method 1000 includes assigning a visible token value to a texture coordinate in the visibility texture atlas, if the fragment is visible. At step 1014, the method 1000 includes retaining the not visible token value in the visibility texture atlas if the fragment is not visible. At step 1016, the method 1000 includes determining the visibility of each pixel of the visibility texture atlas based on the 3D model.

Figure 11:
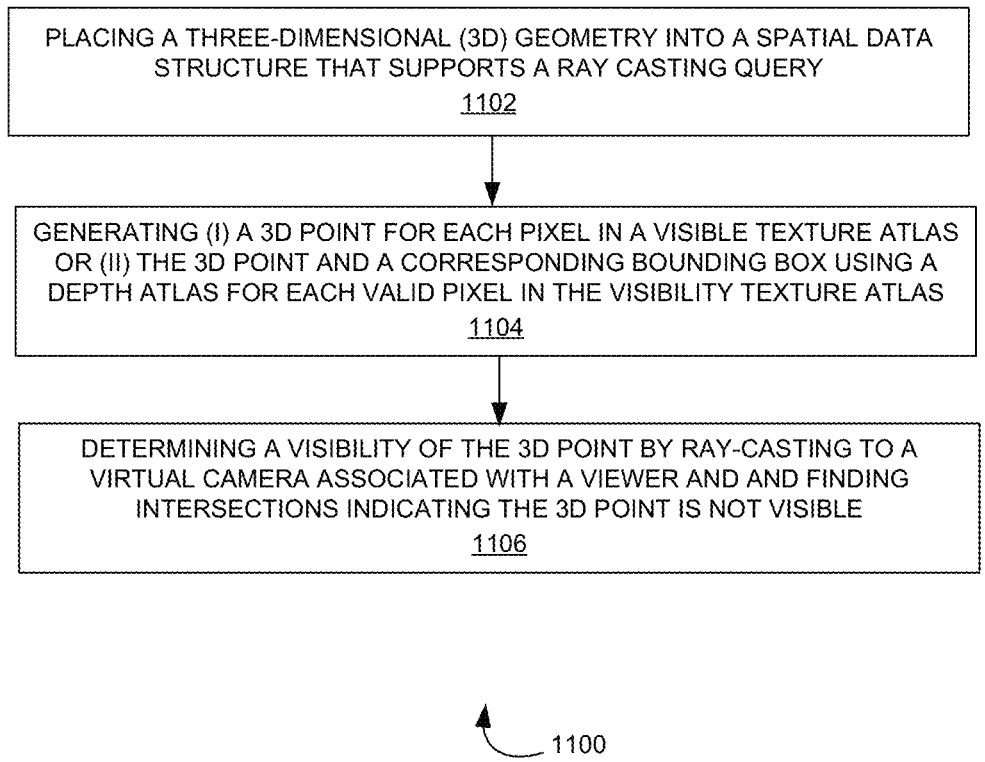
FIG. 11 is a flow diagram that illustrates a method of determining visibility of each pixel in a texture atlas associated with a 3D content, according to some embodiments herein.

FIG. 11 is a flow diagram that illustrates a method of 1100 determining visibility of each pixel in a texture atlas associated with a 3D content according to some embodiments herein. At step 1102, the method 1100 includes placing a 3D geometry into a spatial data structure that supports a ray casting query. At step 1104, the method 1100 includes generating (i) a 3D point for each pixel in the visibility texture atlas or (ii) the 3D point and a corresponding bounding box using a depth atlas for each valid pixel in the visibility texture atlas. At step 1106, the method 1100 includes determining the visibility of the 3D point by ray-casting to the virtual camera 308 associated with the viewer 102A and finding intersections indicating the 3D point is not visible. In some embodiments, if the ray-casting detects an intersection between the virtual camera 308 and the 3D point, the 3D point is not visible.

Figure 12:
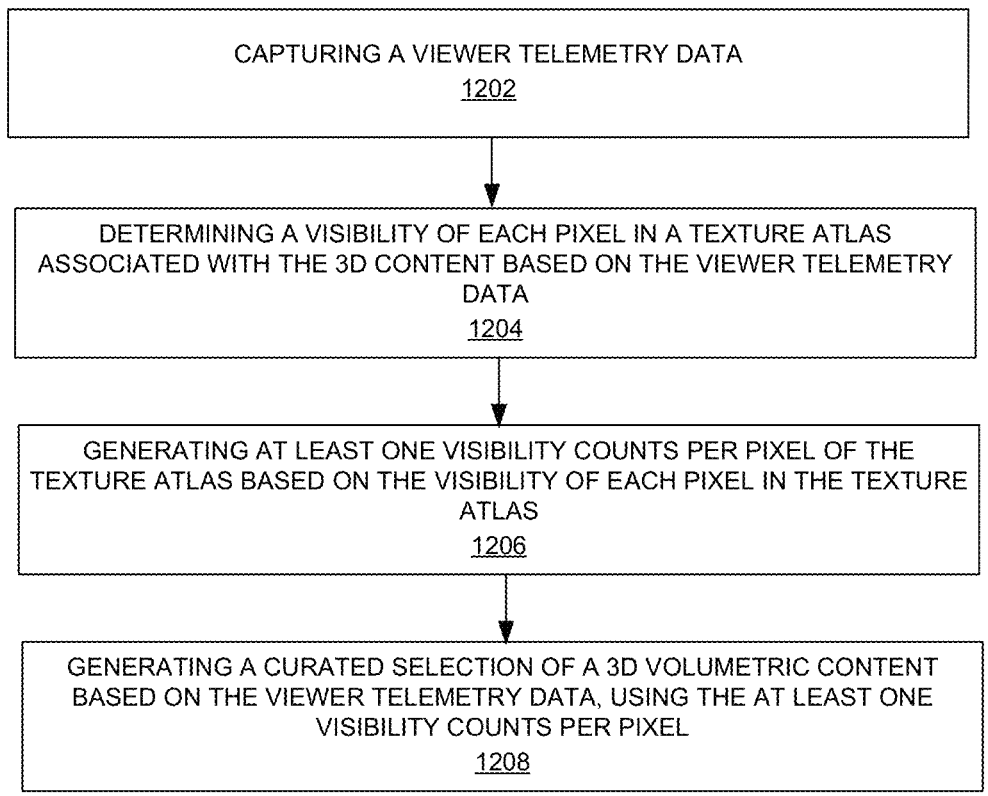
FIG. 12 is a flow diagram that illustrates a method of generating a curated selection of three-dimensional (3D) volumetric content based on a viewer telemetry data according to some embodiments herein.

FIG. 12 is a flow diagram that illustrates a method 1200 of generating the curated selection of three-dimensional (3D) volumetric content 238 based on a viewer telemetry data according to some embodiments herein. At step 1202, the method 1200 includes capturing the viewer telemetry data. In some embodiments, the volumetric video analytics server 114 captures the 3D volumetric content 238 from the content server 112 and the viewer telemetry data of the one or more viewers 102A-N corresponding to the 3D content from the telemetry database 110 of the telemetry server 108. The viewer telemetry data corresponds to at least one of visibility counts data describing intrinsic camera parameters and extrinsic camera parameters associated with a time in the 3D content, data describing, and recording a viewer interaction with the 3D content associated with a time in the 3D content. At step 1204, the method 1200 includes determining a visibility of each pixel in a texture atlas associated with the 3D content based on the viewer telemetry data. At step 1206, the method 1200 includes generating visibility counts per pixel of the texture atlas based on the visibility of each pixel in the texture atlas. The visibility counts per pixel of the texture atlas includes at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations. At step 1208, the method 1200 includes generating the curated selection of the 3D volumetric content 238 based on the viewer telemetry data, using the visibility counts per pixel.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
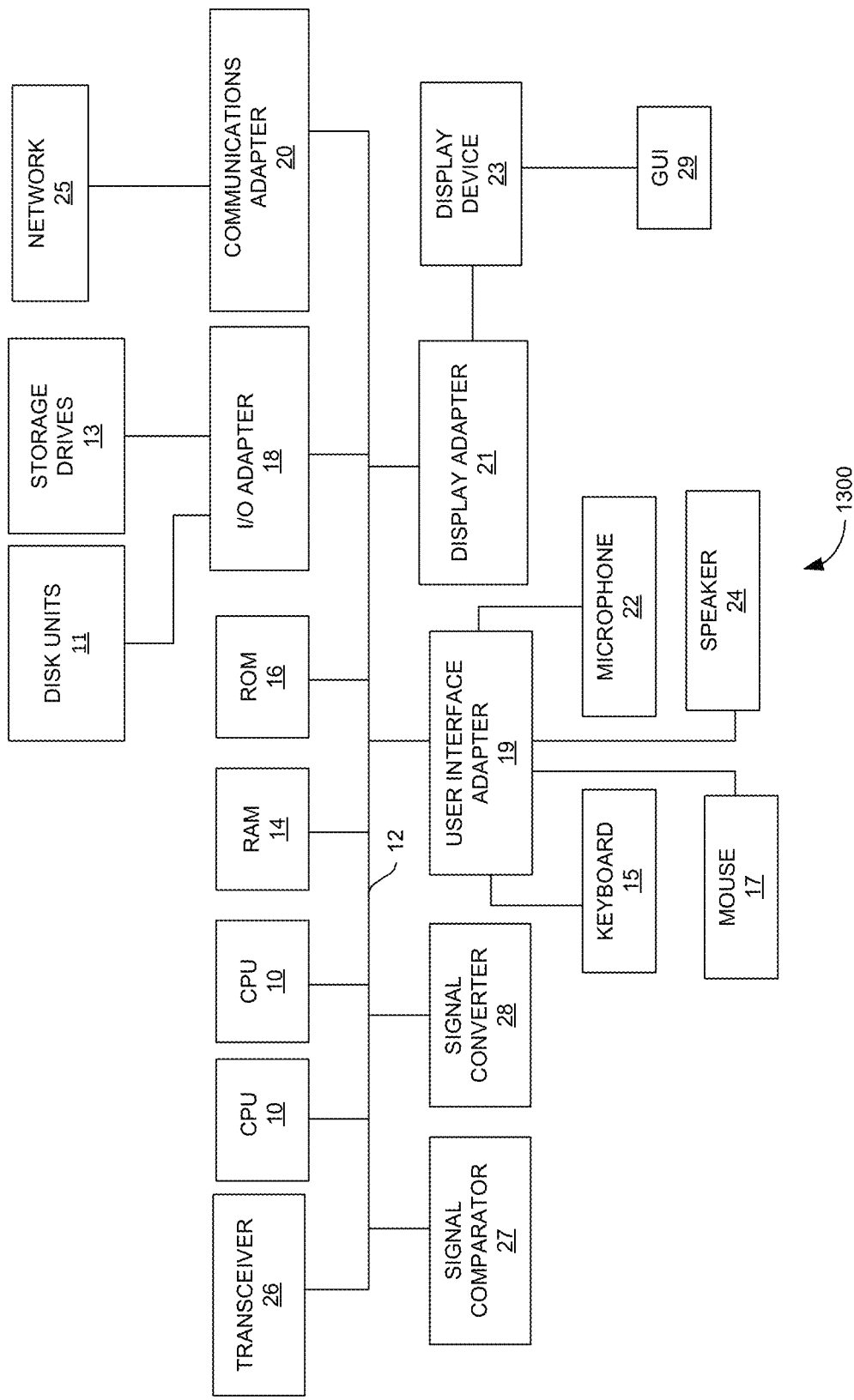
FIG. 13 is a schematic diagram of a computer architecture in accordance with the embodiments herein.

A representative hardware environment for practicing the embodiments herein is depicted in FIG. 13, with reference to FIGS. 1 through 12. This schematic drawing illustrates a hardware configuration of a server/computer system/user device in accordance with the embodiments herein. The viewer device 104A includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The viewer device 104A can read the inventive instructions on the program storage devices and follow these instructions to execute the methodology of the embodiments herein. The viewer device 104A further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method of generating a three-dimensional (3D) volumetric video with an overlay representing visibility counts per pixel of a texture atlas, associated with a viewer telemetry data, the method comprising:
capturing the viewer telemetry data, wherein the viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content;
determining a visibility of each pixel in the texture atlas associated with the 3D content based on the viewer telemetry data;
generating at least one visibility counts per pixel of the texture atlas based on the visibility of each pixel in the texture atlas, wherein the at least one visibility counts per pixel of the texture atlas comprises at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations; and
generating the 3D volumetric video with the overlay of at least one heat map associated with the viewer telemetry data, using the at least one visibility counts per pixel.

2. The processor-implemented method of claim 1, wherein generating the 3D volumetric video with the overlay of the at least one heat map comprises:
generating the at least one heat map with a RGB color per pixel based on the at least one visibility counts per pixel of the texture atlas; and
replacing at least one original texture map of the 3D content with the at least one heat map associated with the viewer telemetry data for each source geometry of the 3D volumetric video to generate the 3D volumetric video with the overlay of the at least one heat map.

3. The processor-implemented method of claim 2, wherein generating the at least one heat map comprising:
generating at least one visibility histogram based on the visibility counts per pixel; and
converting the at least one visibility histogram into the at least one heat map.

4. The processor-implemented method of claim 1, wherein determining the visibility comprises:
- generating at least one of: an index map comprising an image same size as the texture atlas that assigns a unique color to each valid pixel associated with each frame of the 3D content and a visibility texture atlas, wherein the visibility texture atlas is a texture atlas that provides visibility information of at least a subset of pixels in the texture atlas;
- rendering an image associated with the 3D content with the index map comprising the unique color to each valid pixel based on the viewer telemetry data and at least one index texture map to obtain an index rendered image; and
- determining the visibility of each valid pixel by mapping unique colors in the rendered image for a frame to a location of visible pixels in the visibility texture atlas, wherein there is a one to one mapping between the unique colors per frame in the index map and the location of the visible pixels in the visibility texture atlas.

5. The processor-implemented method of claim 1, wherein determining the visibility comprises:
- rendering a 3D model into a depth buffer;
- generating the visibility texture atlas by initializing an image of a same size as the texture atlas;
- representing a visibility of pixels in the visibility texture atlas in a boolean lookup table having a size that is the same as the size of the visibility texture atlas, wherein the boolean lookup table comprises a not visible token value corresponding to each pixel in the visibility texture atlas;
- rendering the 3D model with a fragment shader by:
  - querying the depth buffer by the fragment shader to determine if a fragment is visible; and
  - performing one of:
    - a) assigning a visible token value to at least one texture coordinate in the visibility texture atlas, if the fragment is visible; or
    - b) retaining the not visible token value in the visibility texture atlas if the fragment is not visible; and
- determining the visibility of each pixel of the visibility texture atlas based on the 3D model.

6. The processor-implemented method of claim 1, wherein determining the visibility comprises placing a 3D geometry into a spatial data structure that supports at least one ray casting query;
- generating (i) a 3D point for each pixel in the visibility texture atlas, or (ii) the 3D point and a corresponding bounding box using a depth atlas for each valid pixel in the visibility texture atlas; and
- determining the visibility of the 3D point by ray-casting to a virtual camera associated with the at least one viewer and finding intersections indicating the 3D point is not visible.

7. The processor-implemented method of claim 4, further comprising:
- mapping at least one value in the image back to at least one pixel in the at least one texture map; and
- generating the at least one visibility histogram of the visibility texture atlas based on the mapping.

8. A processor-implemented method of generating a curated selection of three-dimensional (3D) volumetric content based on a viewer telemetry data, the method comprising:
- capturing the viewer telemetry data, wherein the viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content;
- determining a visibility of each pixel in the texture atlas associated with the 3D content based on the viewer telemetry data;
- generating at least one visibility counts per pixel of the texture atlas based on the visibility of each pixel in the texture atlas, wherein the at least one visibility counts per pixel comprises at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations; and
- generating the curated selection of the 3D volumetric content based on the viewer telemetry data, using the visibility counts per pixel.

9. The processor-implemented method of claim 8, wherein generating the curated selection of the 3D volumetric content comprises:
- computing a distance function by employing a standard algorithm on a feature vector comprising at least one of three degrees of freedom of position, three degrees of freedom of orientation and a field of view and using the visibility counts per pixel, wherein the distance function is given by:

$$d\_ij = \text{alpha}*(l2\_norm(p\_i-p\_j)) + \text{beta}*(\text{dot\_product}(q\_i,q\_j)) + \text{gamma}*(f\_i-f\_j),$$

wherein alpha, beta, gamma are relative weighting parameters, wherein i and j refer to unique views, p_i is position i and p_j is position j, wherein p represents three degrees of freedom in position, q represents three degrees of orientation in an axis-angle encoding, f is the field of view, wherein p and q are 3 dimensional, l2_norm or dot_product are functions that take N dimensional vectors and return scalars;
- clustering a plurality of views of the 3D volumetric content to obtain a set of clustered views that are different from one another between one or more canonical views, and that are similar to an original telemetry, wherein clustering is performed based on the distance function using the standard clustering algorithm; and
- generating the curated selection of the 3D volumetric content based on the set of clustered views.

10. The processor-implemented method of claim 8, wherein generating the curated selection of the 3D volumetric content comprises:
- generating an initial set of clusters of views for refining using at least one visibility histogram;
- defining a score for at least one view from among the initial set of clusters of views, wherein the score is the sum of the visibility counts per pixel for each pixel of the texture atlas visible from the at least one view, divided by a number of pixels of the texture atlas visible in the at least one view;
- sampling scores for nearby views of the 3D volumetric content based on the at least one visibility histogram to define a gradient; and computing n steps of a gradient descent to generate the curated selection of the 3D volumetric content based on the scores, wherein n is a whole number.

11. The processor-implemented method of claim 8, wherein determining the visibility comprises:
generating at least one of: an index map comprising an image same size as the texture atlas that assigns a unique color to each valid pixel associated with each frame of the 3D content and the visibility texture atlas by initializing an image of the same size as the texture atlas to zero, wherein the visibility texture atlas is a texture atlas that provides visibility information of at least a subset of pixels in the texture atlas;
rendering an image associated with the 3D content with the index map comprising the unique color to each valid pixel based on the viewer telemetry data and at least one index texture map to obtain an index rendered image; and
determining the visibility of each valid pixel by mapping unique colors in the rendered image for a frame to a location of visible pixels in the visibility texture atlas, wherein there is a one to one mapping between the unique colors per frame in the index map and the location of the visible pixels in the visibility texture atlas.

12. The processor-implemented method of claim 8, wherein determining the visibility comprises:
rendering a 3D model into a depth buffer;
generating the visibility texture atlas by initializing an image of a same size as the texture atlas; representing a visibility of pixels in the visibility texture atlas in a boolean lookup table having a size that is the same as the size of the visibility texture atlas, wherein the boolean lookup table comprises a not visible token value corresponding to each pixel in the visibility texture atlas;
rendering the 3D model with a fragment shader by:
 querying the depth buffer by the fragment shader to determine if a fragment is visible;
 performing one of:
  a) assigning a visible token value to at least one texture coordinate in the visibility texture atlas, if the fragment is visible; or
  b) retaining the not visible token value in the visibility texture atlas if the fragment is not visible; and
determining the visibility of each pixel of the visibility texture atlas based on the 3D model.

13. The processor-implemented method of claim 8, wherein determining the visibility comprises at least one of:
placing a 3D geometry into a spatial data structure that supports at least one ray casting query;
generating (i) a 3D point for each pixel in the visibility texture atlas, or (ii) the 3D point and a corresponding bounding box using a depth atlas for each valid pixel in the visibility texture atlas; and
determining the visibility of the 3D point by ray-casting to a virtual camera associated with the at least one viewer and finding intersections indicating the 3D point is not visible.

14. A system for generating a three-dimensional (3D) volumetric video with an overlay representing visibility counts per pixel of a texture atlas, associated with a viewer telemetry data comprising: a processor and a non-transitory computer readable storage medium storing one or more sequences of instructions, which when executed by the processor, performs a method comprising:
capturing the viewer telemetry data, wherein the viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content;
determining a visibility of each pixel in the texture atlas associated with the 3D content based on the viewer telemetry data;
generating at least one visibility counts per pixel of the texture atlas based on the visibility of each pixel in the texture atlas, wherein the at least one visibility counts per pixel of the texture atlas comprises at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations; and
generating the 3D volumetric video with the overlay of at least one heat map associated with the viewer telemetry data, using the at least one visibility counts per pixel.

15. The system of claim 14, wherein generating the 3D volumetric video with the overlay of the at least one heat map comprises:
generating the at least one heat map with a unique RGB color per pixel based on the at least one visibility counts per pixel of the texture atlas; and
replacing at least one original texture map of the 3D content with the at least one heat map associated with the viewer telemetry data for each source geometry of the 3D volumetric video to generate the 3D volumetric video with the overlay of the at least one heat map.

16. The system of claim 14, wherein generating the at least one heat map comprising:
generating at least one visibility histogram based on the visibility counts per pixel; and
converting the at least one visibility histogram into the at least one heat map.

17. The system of claim 14, wherein determining the visibility comprises:
generating at least one of: an index map comprising an image same size as the texture atlas that assigns a unique color to each valid pixel associated with each frame of the 3D content and the visibility texture atlas by initializing an image of the same size as the texture atlas to zero, wherein the visibility texture atlas is a texture atlas that provides visibility information of at least a subset of pixels in the texture atlas;
rendering an image associated with the 3D content with the index map comprising the unique color to each valid pixel based on the viewer telemetry data and at least one index texture map to obtain an index rendered image; and
determining the visibility of each valid pixel by mapping unique colors in the rendered image for a frame to a location of visible pixels in the visibility texture atlas, wherein there is a one to one mapping between the unique colors per frame in the index map and the location of the visible pixels in the visibility texture atlas.

18. A system for generating a curated selection of three-dimensional (3D) volumetric content based on a viewer telemetry data, comprising: a processor and a non-transitory computer readable storage medium storing one or more sequences of instructions, which when executed by the processor, performs a method comprising:

capturing the viewer telemetry data, wherein the viewer telemetry data corresponds to at least one of the visibility counts per pixel, data describing at least one of intrinsic camera parameters and extrinsic camera parameters and an associated time during a 3D content, and data describing and recording a viewer interaction with the 3D content and the associated time during the 3D content;

determining a visibility of each pixel in the texture atlas associated with the 3D content based on the viewer telemetry data;

generating at least one visibility counts per pixel of the texture atlas based on the visibility of each pixel in the texture atlas, wherein the at least one visibility counts per pixel comprises at least one of: a visibility counts per pixel of views per pixel, a visibility counts per pixel of at least one of a virtual camera position or a set of virtual camera positions, a visibility counts per pixel of a viewer interaction with the 3D content, and a visibility counts per pixel of at least one of a virtual camera orientation or a set of virtual camera orientations; and generating the curated selection of the 3D volumetric content based on the viewer telemetry data, using the visibility counts per pixel.

19. The system of claim 18, wherein generating the curated selection of the 3D volumetric content comprises:

computing a distance function by employing a standard algorithm on a feature vector comprising at least one of three degrees of freedom of position, three degrees of freedom of orientation and a field of view and using the visibility counts per pixel, wherein the distance function is given by:

$$d\_ij = \text{alpha} * (l2\_norm(p\_i - p\_j)) + \text{beta} * (\text{dot\_product}(q\_i, q\_j)) + \text{gamma} * (f\_i - f\_j),$$

wherein alpha, beta, gamma are relative weighting parameters, wherein i and j refer to unique views, p_i is position i and p_j is position j, wherein p represents three degrees of freedom in position, q represents three degrees of orientation in an axis-angle encoding, f is the field of view, wherein p and q are 3 dimensional, l2_norm or dot_product are functions that take N dimensional vectors and return scalars;

clustering a plurality of views of the 3D volumetric content to obtain a set of clustered views that are different from one another between one or more canonical views, and that are similar to an original telemetry, wherein clustering is performed based on the distance function using the standard clustering algorithm; and generating the curated selection of the 3D volumetric content based on the set of clustered views.

20. The system of claim 18, wherein generating the curated selection of the 3D volumetric content comprises:

generating an initial set of clusters of views for refining using at least one visibility histogram;

defining a score for at least one view from among the initial set of clusters of views, wherein the score is the sum of the visibility counts per pixel for each pixel of the texture atlas visible from the at least one view, divided by a number of pixels of the texture atlas visible in the at least one view;

sampling scores for nearby views of the 3D volumetric content based on the at least one visibility histogram to define a gradient; and computing n steps of a gradient descent to generate the curated selection of the 3D volumetric content based on the scores, wherein n is a whole number.

\* \* \* \* \*